United States Patent
Yamazaki et al.

(10) Patent No.: US 12,181,651 B2
(45) Date of Patent: Dec. 31, 2024

(54) METHOD OF ADJUSTING OPTICAL APPARATUS, ADJUSTMENT SUPPORT METHOD, OPTICAL SYSTEM, AND OPTICAL APPARATUS

(71) Applicant: Evident Corporation, Tatsuno-machi (JP)

(72) Inventors: Kentaro Yamazaki, Tokyo (JP); Yasunari Matsukawa, Tokyo (JP)

(73) Assignee: Evident Corporation, Nagano (JP)

( * ) Notice: Subject to any disclaimer, the term of this patent is extended or adjusted under 35 U.S.C. 154(b) by 559 days.

(21) Appl. No.: 17/534,933

(22) Filed: Nov. 24, 2021

(65) Prior Publication Data

US 2022/0082808 A1    Mar. 17, 2022

Related U.S. Application Data

(63) Continuation of application No. PCT/JP2020/021455, filed on May 29, 2020.

(51) Int. Cl.
*G02B 21/24* (2006.01)
*G02B 21/36* (2006.01)

(52) U.S. Cl.
CPC ......... *G02B 21/244* (2013.01); *G02B 21/365* (2013.01)

(58) Field of Classification Search
CPC ...... G02B 21/244; G02B 21/365; G02B 7/28; G02B 7/36; G02B 7/365; G02B 21/00; G02B 21/0004; G02B 21/0032; G02B 21/0052; G02B 21/006; G02B 21/0068; G02B 21/0072; G02B 21/0076; G02B 21/06; G02B 21/36; G02B 21/361

USPC ....... 359/383, 362, 363, 368, 369, 381, 382, 359/385, 386, 387, 388; 250/201.3, 250/201.2, 201.7

See application file for complete search history.

(56) References Cited

U.S. PATENT DOCUMENTS 6,473,228 B1 * 10/2002 Toshimitsu .......... G02B 21/367
                                                              359/380
2011/0102572 A1   5/2011 Kihara et al.
2011/0141260 A1   6/2011 Ouchi et al.

FOREIGN PATENT DOCUMENTS

| JP | 2011095685 A | 5/2011 |
| JP | 2012118553 A | 6/2012 |
| JP | 2012145788 A | 8/2012 |
| JP | 2018173507 A | 11/2018 |
| JP | 2018205069 A | 12/2018 |
| WO | 2009153919 A1 | 12/2009 |

OTHER PUBLICATIONS

International Search Report (ISR) (and English language translation thereof) dated Aug. 25, 2020, issued in International Application No. PCT/JP2020/021455.
Written Opinion dated Aug. 25, 2020, issued in International Application No. PCT/JP2020/021455.

* cited by examiner

*Primary Examiner* — Arnel C Lavarias
(74) *Attorney, Agent, or Firm* — Holtz, Holtz & Volek PC

(57) ABSTRACT

A method of adjusting an optical apparatus that acquires an image of a sample includes the steps of moving a focusing section included in the optical apparatus in a direction in which a contrast of a first image of the sample increases, and adjusting an aberration amount occurring in the optical apparatus in a direction in which a contrast of a second image of the sample increases.

11 Claims, 50 Drawing Sheets

METHOD OF ADJUSTING OPTICAL APPARATUS, ADJUSTMENT SUPPORT METHOD, OPTICAL SYSTEM, AND OPTICAL APPARATUS

CROSS REFERENCE TO RELATED APPLICATIONS

This application is based upon and claims the benefit of priority of the prior Japanese Patent Application No. 2019-102310, filed May 31, 2019, the entire contents of which are incorporated herein by reference.

This is a Continuation Application of PCT Application No. PCT/JP2020/021455, filed May 29, 2020, which was not published under PCT Article 21(2) in English.

BACKGROUND OF THE INVENTION

Field of the Invention

The present disclosure relates to a method of adjusting an optical apparatus, an adjustment support method, an optical system, and an optical apparatus.

Description of the Related Art

In observation of a sample using an optical apparatus having a high numerical aperture, which is represented by a microscope, a spherical aberration greatly changes depending on a slight difference in thickness of a cover glass. The same applies to a case where the depth of a surface to be observed has changed. As means for correcting the spherical aberration that thus varies depending on an observation environment, a correction ring of an objective lens has conventionally been known.

The correction ring is used for moving a lens in an objective lens in an optical axis direction to correct the spherical aberration. With the correction ring, correcting the spherical aberration causes a focus to move along therewith. Thus, work for favorably adjusting both the focus and the spherical aberration is not easy. Accordingly, various techniques have conventionally been proposed.

For example, Japanese Patent Laid-Open No. 2018-205069 discloses to store data describing a positional relationship between an aberration correction lens and an objective lens in advance so as to correct a spherical aberration while suppressing a focus position in a predetermined range, and discloses a technique for correcting the spherical aberration according to the data.

SUMMARY OF THE INVENTION

An adjustment method according to an aspect of the present invention is a method of adjusting an optical apparatus that acquires an image of a sample, the adjustment method including the steps of moving a focusing section included in the optical apparatus in a direction in which a contrast of a first image of the sample increases, and adjusting an aberration amount occurring in the optical apparatus in a direction in which a contrast of a second image of the sample increases, in which an average value of frequency components of the second image is higher than an average value of frequency components of the first image.

An adjustment support method according to an aspect of the present invention is a method of supporting adjustment of an optical apparatus that acquires an image of a sample, the adjustment support method including the steps of causing a display device to display a second image of the sample upon detecting the end of focusing during a period in which a first image of the sample is displayed, and causing the display device to display the first image upon detecting the end of aberration correction during a period in which the second image is displayed, in which an average value of frequency components of the second image is higher than an average value of frequency components of the first image.

An optical system according to an aspect of the present invention includes an optical apparatus that acquires an image of a sample, the optical apparatus including an objective lens, a focusing section that changes a distance between the objective lens and the sample, and a correction device that corrects an aberration, and a control device that controls the optical apparatus. The control device causes the focusing section to move in a direction in which a contrast of a first image of the sample increases, and changes setting of the correction device to adjust an aberration amount occurring in the optical apparatus in a direction in which a contrast of a second image of the sample increases, and an average value of frequency components of the second image is higher than an average value of frequency components of the first image.

An optical apparatus according to another aspect of the present invention is an optical apparatus that acquires an image of a sample, the optical apparatus including an objective lens including a correction ring that corrects a spherical aberration, and an optical element that emphasizes the spherical aberration.

BRIEF DESCRIPTION OF THE DRAWINGS

The present invention will be more apparent from the following detailed description when the accompanying drawings are referenced.

DESCRIPTION OF EMBODIMENTS

To favorably adjust both a focus and an aberration using a technique described in Japanese Patent Laid-Open No. 2018-205069, data needs to be previously stored for each objective lens and for each sample. Accordingly, a situation where various objective lenses and samples can be used is difficult to cope with.

Embodiments of the present invention will be described below.

Figure 1:
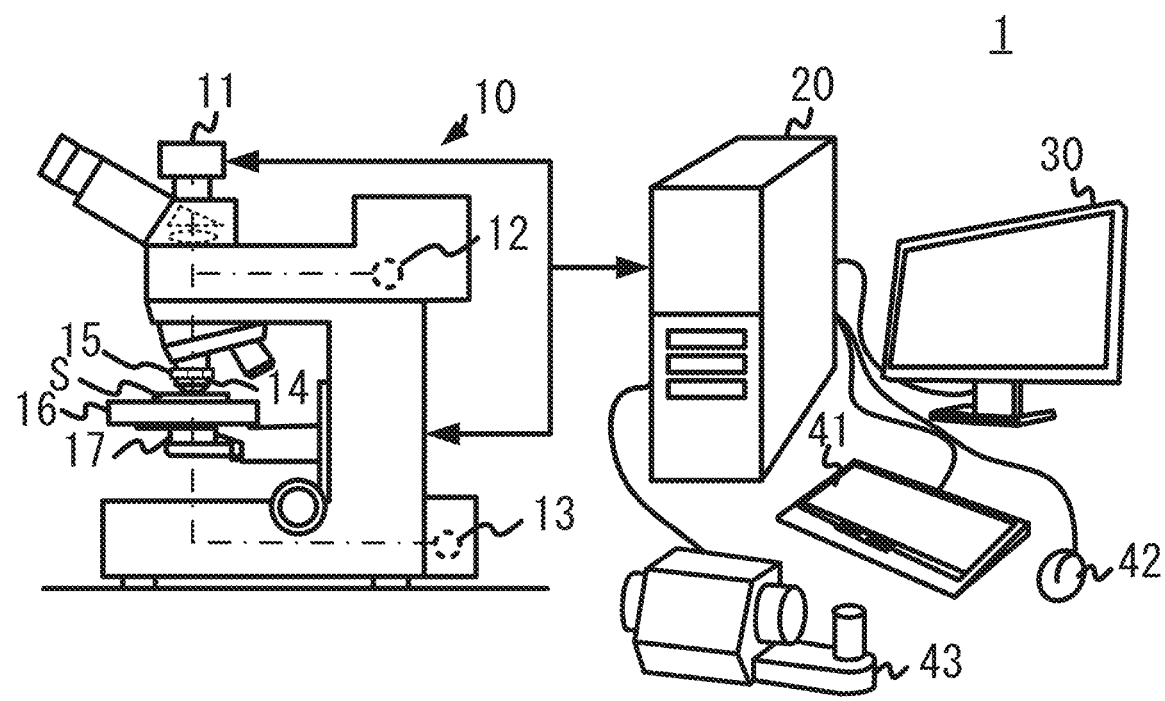
FIG. 1 is a diagram illustrating a configuration of a microscope system 1.
Figure 2:
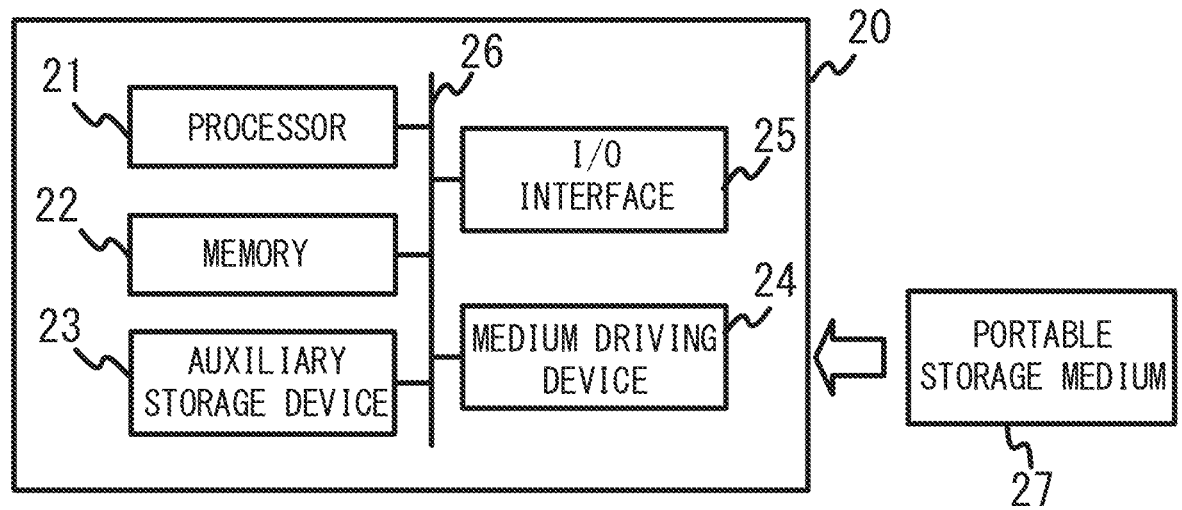
FIG. 2 is a diagram illustrating a configuration of a control device 20.

FIG. 1 is a diagram illustrating a configuration of a microscope system 1. FIG. 2 is a diagram illustrating a configuration of a control device 20. The configuration of the microscope system 1 will be described below with reference to FIGS. 1 and 2.

The microscope system 1 is an example of an optical system, and includes a microscope 10 and a control device 20. The microscope system 1 may further include a display device 30 and an input device (a keyboard 41, a mouse 42, and a handle 43), as illustrated in FIG. 1.

The microscope 10 is an optical apparatus that acquires an image of a sample S. The microscope 10 includes an image pickup device 11, a light source (a light source 12 and a light source 13), an objective lens 14, a correction ring 15, a stage 16, and a capacitor 17, for example.

The image pickup device 11 is a digital camera including an image sensor that converts incident observation light into an electric signal. Examples of the image sensor include a CCD (charge coupled device) image sensor and a CMOS (complementary metal oxide semiconductor) image sensor, and is a two-dimensional image sensor. The image pickup device 11 may be a color camera. An image of the sample S acquired by the image pickup device 11 is output from the image pickup device 11 to the control device 20.

Examples of the light source 12 and the light source 13 include a mercury lamp, a xenon lamp, and an LED light source. The light source 12 and the light source 13 are used by being switched depending on an illumination method. The light source 12 is a light source used for epi-illumination. The light source 13 is a light source used for transmission illumination.

The objective lens 14 is a microscope objective lens mounted on a revolver. The objective lens 14 is provided with the correction ring 15. The correction ring 15 is a correction device that corrects a spherical aberration by moving some of a lenses constituting the objective lens 14 in an optical axis direction. Setting of the correction ring 15 (i.e., a position of the lens) is changed. As a result, the correction ring 15 can adjust an aberration amount occurring in the objective lens 14 and thus an aberration amount occurring in the microscope 10. The correction ring 15 may be an electrically-driven correction ring the setting of which is to be changed in accordance with an instruction from the control device 20, for example. The setting of the correction ring 15 can also be changed by operating the handle 43, for example.

The sample S is arranged on the stage 16. The stage 16 may be an electrically-driven stage, for example, and is a focusing section that changes a distance between the objective lens 14 and the sample S. The microscope 10 may have a structure that moves the objective lens 14 in the optical axis direction. In the case, the structure that moves the objective lens 14 in the optical axis direction is a focusing section. A position of the focusing section can also be changed by operating the handle 43, for example.

The control device 20 is a control device that controls the microscope 10. The control device 20 may cause the focusing section to move based on an image processing result. The control device 20 may change the setting of the correction ring 15 based on the image processing result. The control device 20 may cause the focusing section to move in response to a signal from the input device. The control device 20 may change the setting of the correction ring 15 in response to the signal from the input device.

The control device 20 is a standard computer, for example. The control device 20 includes a processor 21, a memory 22, an auxiliary storage device 23, a medium driving device 24 that drives a portable storage medium 27, and an I/O interface 25, as illustrated in FIG. 2. These constituent elements are connected to one another via a bus 26.

The processor 21 is any processing circuit including a CPU (central processing unit) and a GPU (graphic processing unit), for example. The processor 21 performs programmed processing by loading a program stored in the auxiliary storage device 23 or the portable storage medium 27 into the memory 22 and executing the program. The processor 21 may perform processing illustrated in FIG. 3, described below, by executing the program and performing programmed processing.

The memory 22 is a RAM (random access memory), for example. The memory 22 functions as a work memory storing a program or data stored in the auxiliary storage device 23 or the portable storage medium 27 when executing the program. The auxiliary storage device 23 is a hard disk or a flash memory, for example, and is mainly used to store various types of data and programs. The medium driving device 24 contains the portable storage medium 27 such as an optical disk or a compact Flash (registered trademark). The auxiliary storage device 23 and the portable storage medium 27 are each an example of a non-transitory computer readable storage medium storing a program.

Examples of the I/O (input/output) interface 25 include a USB (universal serial bus) interface circuit and an HDMI (high-definition multimedia interface registered trademark)) circuit. The microscope 10, the display device 30, and the input device (the keyboard 41, the mouse 42, and the handle 43), for example, are connected to the I/O interface 25.

The control device 20 may include an NW (network) interface not illustrated. The NW interface may be a wireless communication module, for example, or may be a LAN (local area network) card, for example. The control device 20 may receive data from an external apparatus outside the microscope system 1 via the NW interface. The control device 20 may transmit data acquired by the microscope system 1 to the external apparatus via the NW interface.

The configuration illustrated in FIG. 2 is an example of a hardware configuration of the control device 20. The control device 20 is not limited to this configuration. The control device 20 may be not a general-purpose device but a dedicated device. For example, the control device 20 may include a custom-designed electric circuit instead of or in addition to the processor 21 that reads and executes a software program.

Examples of the display device 30 include a liquid crystal display, an organic EL display, and a CRT (cathode ray tube) display. The input device (the keyboard 41, the mouse 42, and the handle 43) is a device to be directly operated by a user of the microscope system 1. The input device inputs information corresponding to a user's operation to the control device 20. The microscope system 1 may include other input devices, e.g., a joystick and a touch panel in addition to or instead of the keyboard, the mouse, and the handle.

Figure 3:
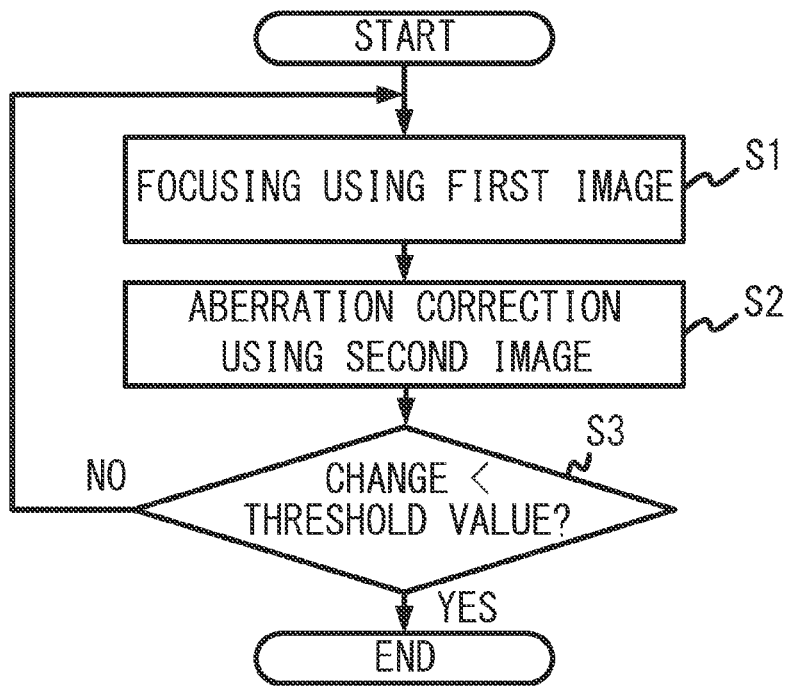
FIG. 3 illustrates an example of a flowchart of adjustment processing.
Figure 4:
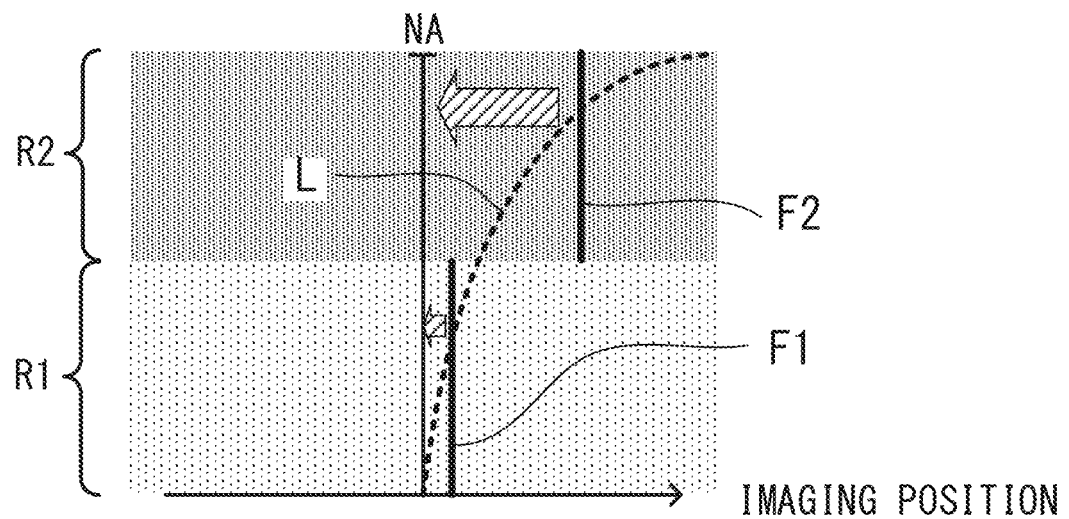
FIG. 4 is a diagram for describing a method of adjusting a focal plane.

FIG. 3 illustrates an example of a flowchart of adjustment processing. FIG. 4 is a diagram for describing a method of adjusting a focal plane. A method of adjusting the microscope 10 that favorably adjusts both a focus and an aberration will be described below with reference to FIGS. 3 and 4.

The microscope system 1 first performs focusing using a first image of the sample S (step S1), as illustrated in FIG. 3. The focusing is performed by moving the focusing section to change a distance between the sample S and the objective lens 14. As evaluation criteria, a contrast of an image is used. Step S1 is a process by the control device 20 for moving the focusing section in a direction in which a contrast of the first image of the sample S increases. The first image has a feature that an average value of frequency components included in the first image is lower than an average value of frequency components included in a second image, described below.

A method of calculating the contrast of the image is not particularly limited, but may be Brenner Gradient, for example. The Brenner Gradient is obtained by integrating the square of a difference between respective pixel values of neighboring pixels within a predetermined region. The predetermined region in which the integration is performed may be the entire image or may be a target region in the image.

Further, the microscope system 1 performs aberration correction using the second image of the sample S (step S2). The aberration correction is performed by adjusting an aberration amount occurring in the microscope 10. More specifically, the aberration correction is performed by changing setting of the correction ring 15 and adjusting the aberration amount occurring in the microscope 10. As evaluation criteria of the aberration correction, the contrast of the image is used, like in the focusing. Step S2 is a process by the control device 20 for changing the setting of the objective lens 14 and adjust the aberration amount occurring in the microscope 10 in a direction in which a contrast of the second image of the sample S increases. The second image has a feature that the average value of the frequency components included in the second image is higher than the average value of the frequency components included in the first image, described above.

The first image and the second image may have a relationship in which the average value of the frequency components included in the second image is higher than the average value of the frequency components included in the first image. That is, the first image and the second image are determined depending on which of the respective average frequency components included in the images is higher. Therefore, a "low frequency" and a "high frequency" referred to in this specification are not absolute but relative unless otherwise specified.

Then, the microscope system 1 determines whether or not a focus movement amount in which the focus has moved by the focusing or an aberration amount that has changed by the aberration correction is less than a threshold value (step S3). If the changed aberration amount is less than the threshold value, the adjustment processing is ended. This is because a state where the focus movement amount is sufficiently small in the focusing after the aberration correction or a state where the change of the aberration amount is sufficiently small in the aberration correction after the focusing is considered to be a state where the aberration has been favorably corrected without defocusing.

FIG. 4 is a vertical aberration diagram relating to a spherical aberration. The spherical aberration is a phenomenon due to the fact that the higher a numerical aperture corresponding to a light beam is, the more strongly the light beam is refracted. In a state where the spherical aberration has not been favorably corrected, a light beam corresponding to a high numerical aperture and a light beam corresponding to a low numerical aperture are respectively focused at different positions, as indicated by a line L illustrated in FIG. 4. This means that in a state where the spherical aberration has been favorably corrected, the light beam corresponding to the high numerical aperture and the light beam corresponding to the low numerical aperture are focused at the same position. The adjustment method illustrated in FIG. 3 uses such a feature of the spherical aberration.

A focus position F1 and a focus position F2 illustrated in FIG. 4 respectively indicates as an example a position where the light beam corresponding to the low numerical aperture is focused and a position where the light beam corresponding to the high numerical aperture is focused. A region R1 and a region R2 illustrated in FIG. 4 respectively indicate as an example a spatial frequency region corresponding to the low numerical aperture and a spatial frequency region corresponding to the high numerical aperture.

The reason why when the focusing and the aberration correction are compared with each other, the second image, i.e., the relatively high frequency component is used for the aberration correction in the adjustment method illustrated in FIG. 3 is as follows. That is, the spherical aberration is proportional to the cube of a numerical aperture, and an effect of a variation in the spherical aberration significantly appears in an image formed by a light beam corresponding to a high numerical aperture, i.e., the second image. Therefore, when the aberration correction is performed based on the second image, the aberration correction can be performed more easily and with higher accuracy than when the aberration correction is performed based on the first image.

On the other hand, the reason why when the focusing and the aberration correction are compared with each other, the first image, i.e., the relatively low frequency component is used for the focusing in the adjustment method illustrated in FIG. 3 is as follows. In the first image, a variation in contrast due to the spherical aberration is small. Accordingly, even in a state where the spherical aberration is not sufficiently corrected, the focusing can be performed at a position close to a focus position in a state where the spherical aberration has been corrected (hereinafter referred to as an ideal focus position). Therefore, when the focusing is performed based on the first image, the focus can be brought closer to the ideal focus position more easily and with higher accuracy than when the focusing is performed based on the second image.

Further, a case where the focus position F1 and the focus position F2 illustrated in FIG. 4 sufficiently come closer to each other and both the focus positions come closer to the ideal focus position will be discussed. In this case, when an aberration correction process based on the second image and a focusing process based on the first image are repeated, respective adjustment amounts (a movement amount of the focusing section and a rotation amount of the correction ring 15) in the processes are sufficiently small. Therefore, in the adjustment method illustrated in FIG. 3, a timing at which the adjustment is ended can be easily determined based on at least one of the movement amount of the focusing section and the rotation amount of the correction ring 15.

Therefore, the microscope system 1 makes it possible to favorably adjust both the focus and the aberration by performing the adjustment method illustrated in FIG. 3. Specific examples of the above-described adjustment method will be described in more detail below.

First Embodiment

Figure 5:
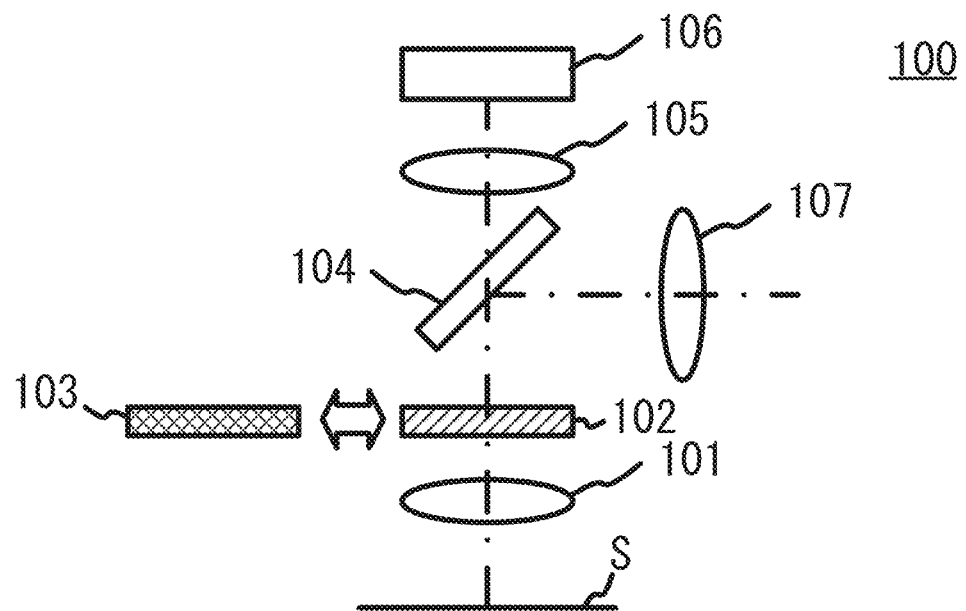
FIG. 5 is a diagram illustrating a configuration of a microscope 100.

FIG. 5 is a diagram illustrating a configuration of a microscope 100. A microscope system according to the present embodiment differs from the microscope system 1 illustrated in FIG. 1 in that it includes the microscope 100 instead of the microscope 10. Other components are similar to those in the microscope system 1.

The microscope 100 is a microscope that performs brightfield observation using epi-illumination, and includes an objective lens 101, modulation elements used by being switched (a modulation element 102 and a modulation element 103), a splitter 104, an imaging lens 105, an image pickup device 106, and a lens 107.

The modulation element 103 is an optical element that emphasizes a spherical aberration of an image to be acquired. When the modulation element 103 is inserted into an observation optical path and is used for observation, the spherical aberration is more emphasized than when the modulation element 103 is not used. Accordingly, the spherical aberration can be easily corrected.

The objective lens 101 is a microscope objective lens having a correction ring. The splitter 104 is a splitter that separates an illumination optical path and an observation optical path, and is a half mirror, for example. The lens 107 is a lens arranged on the illumination optical path. The modulation element 102 and the modulation element 103 are each a modulation element that modulates illumination light and observation light. The modulation element 102 and the modulation element 103 are selectively arranged at a pupil position of the objective lens 101 or its vicinity by a turret not illustrated, for example.

Figure 6:
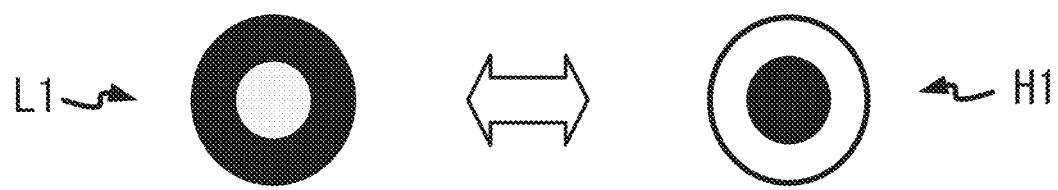
FIG. 6 is a diagram illustrating an example of a modulation pattern of a modulation element.

FIG. 6 is a diagram illustrating an example of a modulation pattern of a modulation element. A modulation pattern L1 illustrated in FIG. 6 represents a transmittance distribution of the modulation element 102, for example. A modulation pattern H1 illustrated in FIG. 6 represents a transmittance distribution of the modulation element 103, for example. Black represents a region having a low transmittance, and white represents a region having a high transmittance.

When the modulation pattern L1 and the modulation pattern H1 that differ from each other are compared with each other, the modulation pattern L1 has a high transmittance distribution in the vicinity of an optical axis, while the modulation pattern H1 has a high transmittance distribution in a region spaced apart from the optical axis. Accordingly, with the modulation pattern L1 arranged on an optical path, the microscope 100 acquires a first image based on a light beam corresponding to a relatively low numerical aperture. On the other hand, with the modulation pattern H1 arranged on the optical path, the microscope 100 acquires a second image based on a light beam corresponding to a relatively high numerical aperture. Hereinafter, among the modulation elements to be used by being switched, the modulation element corresponding to a lower frequency component is referred to as a first modulation element, and the modulation element corresponding to a higher frequency component is referred to as a second modulation element.

Figure 7:
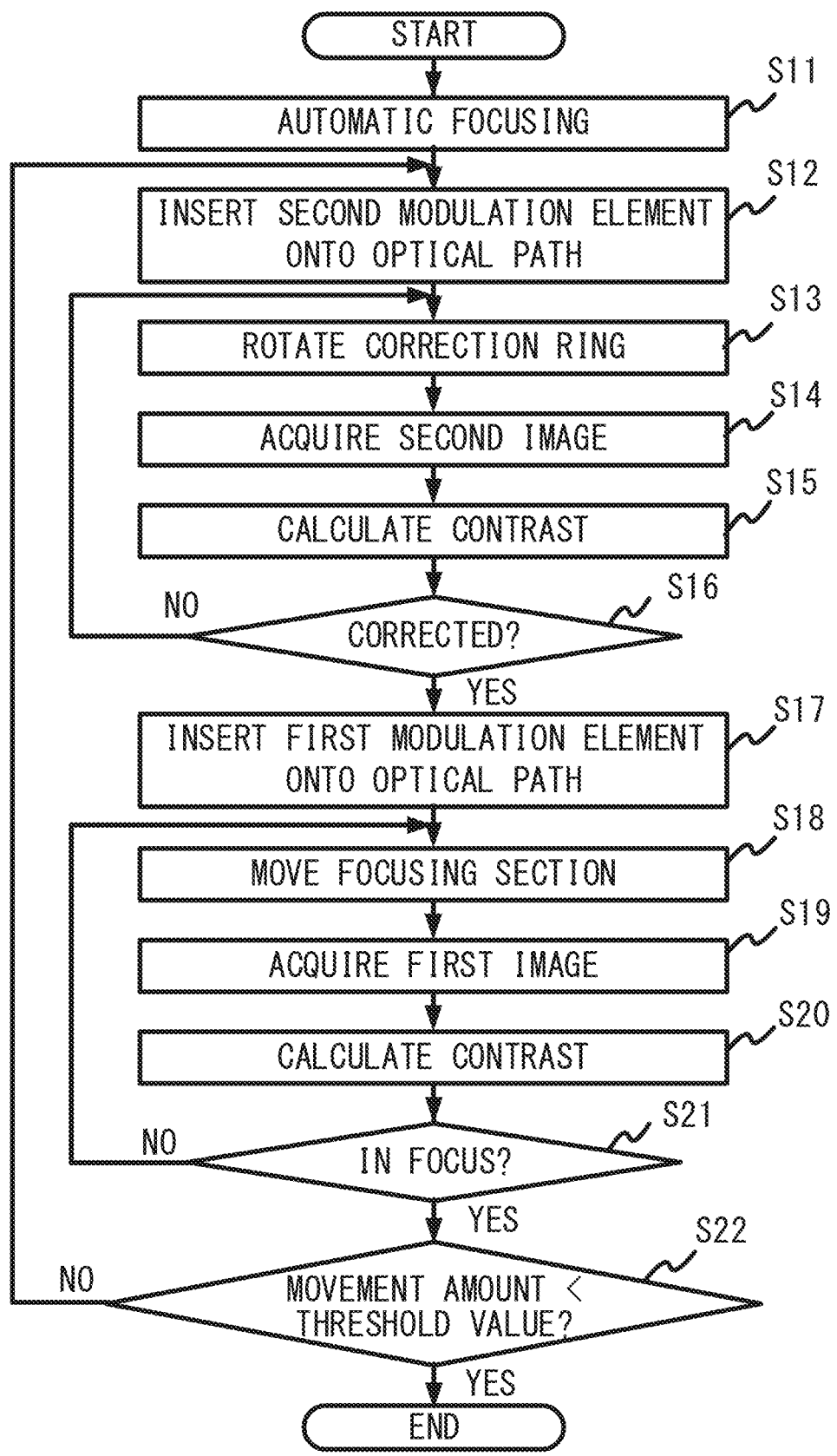
FIG. 7 is a flowchart of automatic adjustment processing according to a first embodiment.

FIG. 7 is a flowchart of automatic adjustment processing according to the present embodiment. A method of automatically adjusting the microscope 100 will be described below with reference to FIG. 7.

When the automatic adjustment processing illustrated in FIG. 7 is started, a control device 20 first controls the microscope 100 to perform automatic focusing (step S11). In step S11, the control device 20 performs the automatic focusing with both the modulation element 102 and the modulation element 103 arranged outside the optical path.

Then, the control device 20 causes the modulation element 103 as the second modulation element to be inserted into the optical path (step S12). As a result, a pupil function of an optical system of the microscope 100 is changed. Then, the control device 20 causes the correction ring to rotate by a predetermined amount (step S13), causes the microscope 100 to acquire a second image (step S14), and calculates a contrast of the second image acquired in step S14 (step S15). The control device 20 searches for setting of the correction ring in which the contrast reaches its maximum while repeating processing from step S13 to step S15, and determines that an aberration has been corrected when the contrast reaches the maximum (step S16).

A hill-climbing method, for example, may be used. The control device 20 causes the correction ring to rotate by a predetermined amount at each time. The contrast to be calculated starts to decrease when it exceeds the maximum value. At that time, the control device 20 causes the correction ring to return to a position of the correction ring at which the contrast reaches the maximum. The control device 20 determines the position to which the correction ring is returned as a position where the aberration has been corrected.

When aberration correction ends, the control device 20 causes the modulation element 103 to move out of the optical path and inserts the modulation element 102 as the first modulation element onto the optical path (step S17). As a result, the pupil function of the optical system of the microscope 100 is changed. Then, the control device 20 causes a focusing section to move by a predetermined amount (step S18), and causes the microscope 100 to acquire a first image (step S19). The control device 20 calculates a contrast of the first image acquired in step S19 (step S20). The control device 20 searches for a position of the focusing section at which the contrast reaches its maximum while repeating processing from step S18 to step S20, and determines that focusing has been performed when the contrast reaches the maximum (step S21).

When the focusing ends, the control device 20 determines whether or not a movement amount of the focusing section that has moved by the focusing is less than a threshold value (step S22). The threshold value is not particularly limited if it is a sufficiently small value. The threshold value may be a depth of focus dependent on a numerical aperture of the objective lens 101, for example.

If the control device 20 determines that the movement amount is less than the threshold value (YES in step S22), the processing illustrated in FIG. 7 is ended. On the other hand, unless the control device 20 determines that the movement amount is less than the threshold value (NO in step S22), the processing returns to step S12, the aberration correction and the focusing are repeated until the movement amount is less than the threshold value.

As described above, the microscope system according to the present embodiment makes it possible to favorably adjust both a focus and an aberration by performing the automatic adjustment method illustrated in FIG. 7. In the automatic adjustment method illustrated in FIG. 7, a person need not issue an instruction to the microscope system from the start to the end of the processing, thereby making it possible to completely automatically perform the focusing and the aberration correction.

Although the modulation elements having the patterns illustrated in FIG. 6 are respectively illustrated as an example of the first modulation element and the second modulation element, the patterns of the modulation elements are not respectively limited to those in this example. The first modulation element may have a transmittance distribution represented by a modulation pattern L2 illustrated in FIG. 8, for example. The second modulation element may have a transmittance distribution represented by a modulation pattern H2 illustrated in FIG. 8, for example.

Figure 9:
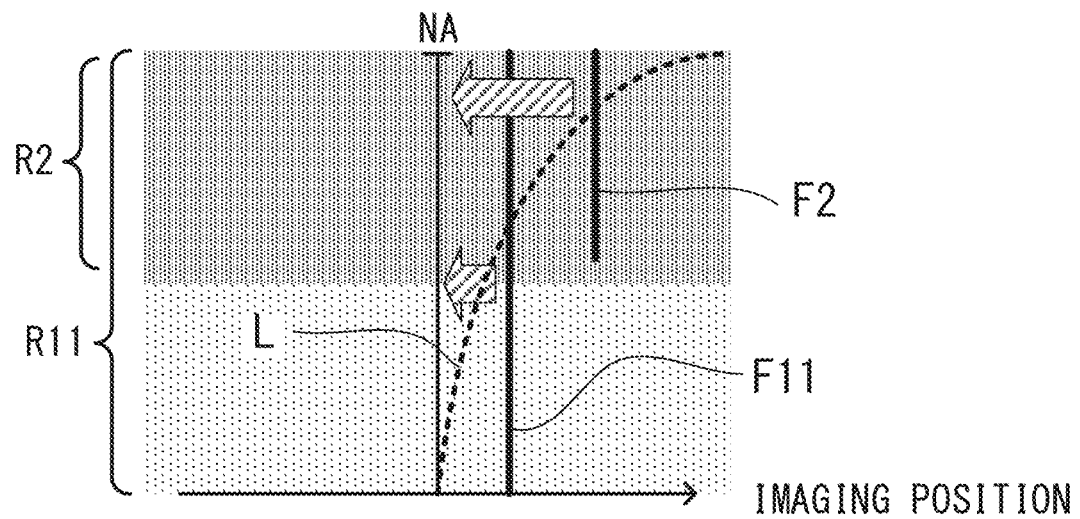
FIG. 9 is another diagram for describing a method of adjusting a focal plane.
Figure 10:
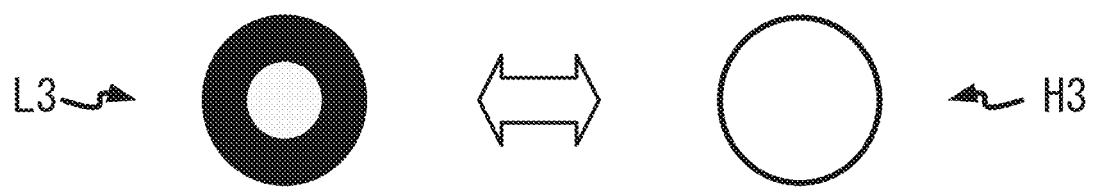
FIG. 10 is a diagram illustrating still another example of a modulation pattern of a modulation element.
Figure 11:
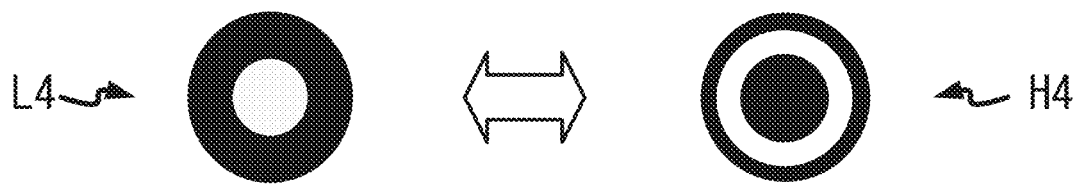
FIG. 11 is a diagram illustrating still another example of a modulation pattern of a modulation element.
Figure 12:
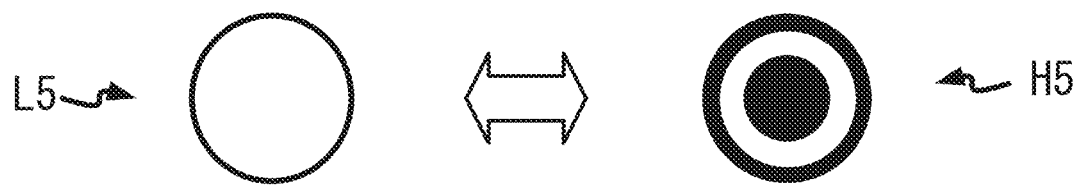
FIG. 12 is a diagram illustrating still another example of a modulation pattern of a modulation element.
Figure 13:
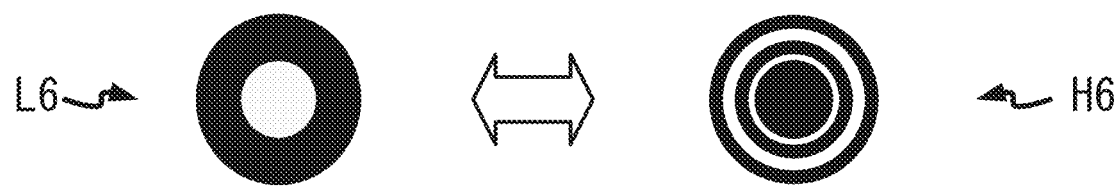
FIG. 13 is a diagram illustrating still another example of a modulation pattern of a modulation element.
Figure 14:
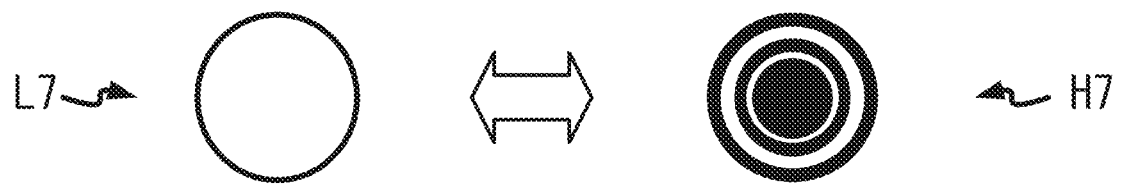
FIG. 14 is a diagram illustrating still another example of a modulation pattern of a modulation element.
Figure 15:
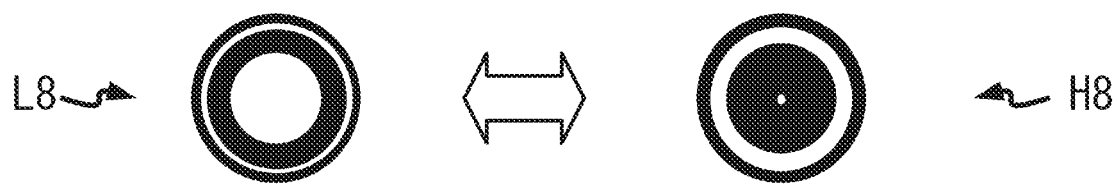
FIG. 15 is a diagram illustrating still another example of a modulation pattern of a modulation element.
Figure 16:
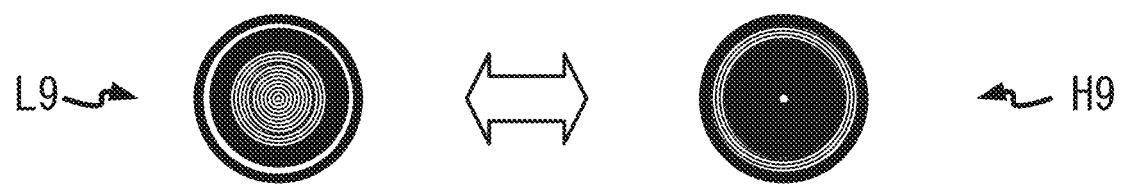
FIG. 16 is a diagram illustrating still another example of a modulation pattern of a modulation element.

In this case, the first image to be acquired using the first modulation element is less easily affected by the spherical aberration than an image acquired using the second modulation element, as illustrated in FIG. 9. Accordingly, the focus can be brought closer to an ideal focus position. The second image to be acquired using the second modulation element is more easily affected by the spherical aberration than an image acquired using the first modulation element, as illustrated in FIG. 9. Accordingly, the spherical aberration can be corrected with higher accuracy.

A focus position F11 and a focus position F2 illustrated in FIG. 9 respectively indicate as an example a focus position corresponding to the first image and a focus position corresponding to the second image. A region R11 and a region R2 illustrated in FIG. 9 respectively indicate as an example a region representing frequency components included in the first image and a region representing frequency components included in the second image.

Figure 8:
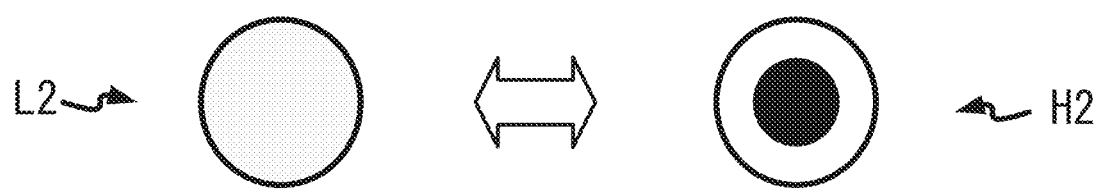
FIG. 8 is a diagram illustrating another example of a modulation pattern of a modulation element.

The transmittance distribution represented by the modulation pattern L2 illustrated in FIG. 8 can be realized without using the modulation element. Therefore, switching between the modulation pattern L2 and the modulation pattern H2 illustrated in FIG. 8 can be realized by inserting and removing the second modulation element (an optical element for emphasizing the spherical aberration) into and from the optical path. In this case, a burden on switching work can be reduced, and the number of optical elements required for the optical system can also be reduced.

FIGS. 10 to 16 are diagrams each illustrating still another example of a modulation pattern of a modulation element. The microscope system according to the present embodiment may use combinations of modulation patterns illustrated in FIGS. 10 to 16 (a modulation pattern L3 and a modulation pattern H3 to a modulation pattern L9 and a modulation pattern H9). In the case, both an image that is not easily affected by the spherical aberration and an image that is easily affected by the spherical aberration can be acquired.

More specifically, in the microscope 100, the first modulation element and the second modulation element desirably satisfy the following conditional expression, where f(r) is a transmittance distribution of the first modulation element, g(r) is a transmittance distribution of the second modulation element, r is a distance from the optical axis, L1 is a radius of an on-axis bundle of rays when the on-axis bundle of rays is incident on the first modulation element, and L2 is a radius of the on-axis bundle of rays when the on-axis bundle of rays is incident on the second modulation element.

$$\int_0^{L1} r \cdot f(r) dr < \int_0^{L2} r \cdot g(r) dr \qquad (1)$$

Considering that the second modulation element (the optical element for emphasizing the spherical aberration) is inserted into or removed from the optical path without using the first modulation element as in FIG. 8, each of parameters in the conditional expression (1) can be expressed in different words as follows. When observation is performed using the optical element for emphasizing the spherical aberration, a region in the microscope 100 where the optical element is arranged is defined as a target region. In this case, f(r) is a transmittance distribution of the target region in a case where the optical element for emphasizing the spherical aberration is not used, g(r) is a transmittance distribution of the optical element for emphasizing the spherical aberration, r is a distance from the optical axis, L1 is a radius of an on-axis bundle of rays when the on-axis bundle of rays is incident on the target region in a case where the optical element for emphasizing the spherical aberration is not used, and L2 is a radius of the on-axis bundle of rays when the on-axis bundle of rays is incident on the optical element for emphasizing the spherical aberration. The expression in different words is also applicable to not only FIG. 8 but also FIG. 6, FIGS. 10 to 16, FIG. 25, and FIGS. 28 to 47. That is, if the modulation elements on the left and the right of an arrow are alternatively used, a case where the first modulation element on the left side is used corresponds to a case where the optical element for emphasizing the spherical aberration is not used. A case where the second modulation element on the right side is used corresponds to a case where the optical element for emphasizing the spherical aberration is used.

When the conditional expression (1) is satisfied, an average value of frequency components included in the image acquired using the second modulation element is higher than an average value of frequency components included in the image acquired using the first modulation element. Accordingly, both an image that is not easily affected by the spherical aberration and an image that is easily affected by the spherical aberration can be acquired.

As described above, an example in which the modulation element is arranged at the pupil position of the objective lens 101 or the vicinity thereof has been described. However, a position where the modulation element is arranged is not limited to the pupil position of the objective lens 101 or the vicinity thereof. Instead of a position P1 illustrated in FIG. 17 as the pupil position or the vicinity thereof, the modulation element may be arranged at a position P2 or a position P3 optically conjugate with the pupil of the objective lens 101. The position P2 and the position P3 are respectively positions conjugate with the pupil on a transmission-illumination optical path and an epi-illumination optical path or their vicinities. Even at the positions, a light beam having a high numerical aperture and a light beam having a low numerical aperture respectively pass through spatially different positions. Accordingly, frequency components can be restricted by the modulation element.

Figure 17:
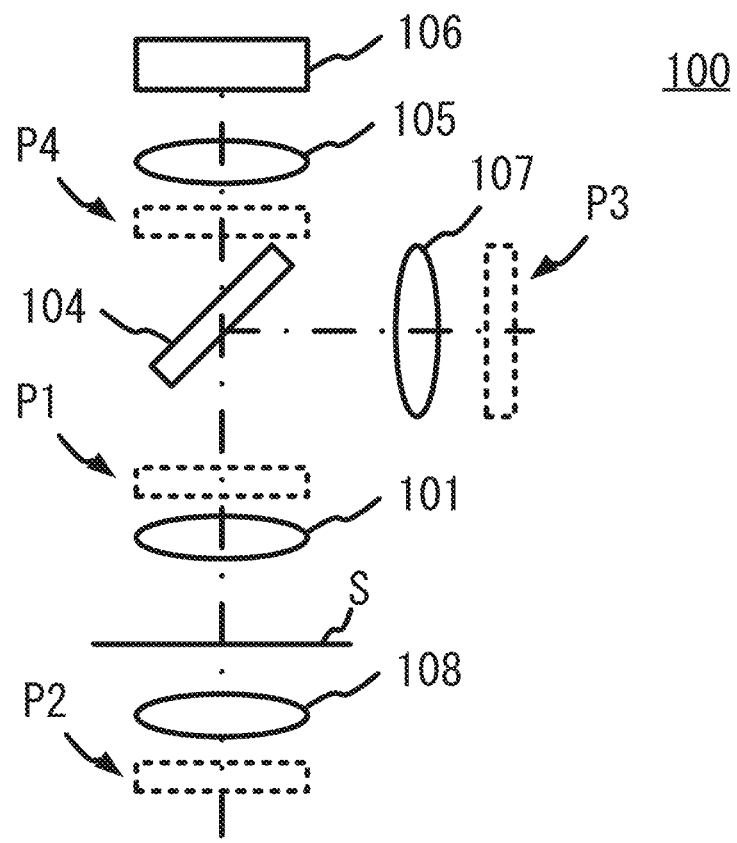
FIG. 17 is a diagram for describing a position where a modulation element is arranged.

The modulation element may be arranged at a position P4 illustrated in FIG. 17. The position P4 is a position between the objective lens 101 and an imaging lens 105. A parallel bundle of rays formed by the objective lens 101 passes through the position P4. Even at the position P4, a light beam having a high numerical aperture and a light beam having a low numerical aperture respectively pass through spatially different positions in a paraxial region. Accordingly, even when the modulation element is arranged at the position P4, only information in the vicinity of the center of a field of view is used, thereby making it possible to acquire both an image that is not easily affected by the spherical aberration and an image that is easily affected by the spherical aberration.

A case where bright-field observation is performed by the microscope 100 has been described as an example. However, if the microscope is a fluorescent microscope, a modulation element is desirably arranged at a position where at least observation light is modulated. Accordingly, the modulation element is desirably arranged at the position P1 or the position P4 illustrated in FIG. 17, for example. If the microscope is a multiphoton excitation microscope or a sheet illumination microscope, a modulation element is desirably arranged at a position where at least illumination light is modulated. If the microscope is a disk scanning microscope, a modulation element is desirably arranged on the side closer to an object than a rotary disk. If the microscope is a confocal microscope, a modulation element is desirably arranged at a position where at least one of illumination light and observation light is to be modulated, like in the bright-field observation.

As described above, an example in which the microscope system temporarily acquires the first image and the second image in this order has been described. However, the first image and the second image may be simultaneously acquired. FIGS. 18 to 24 are diagrams each illustrating a configuration of a modification of the microscope 100. The microscope system according to the present embodiment may include a microscope 200 illustrated in FIG. 18 to a microscope 800 illustrated in FIG. 24 instead of the microscope 100. The microscope 200 to the microscope 800 can each simultaneously acquire a first image and a second image.

Figure 18:
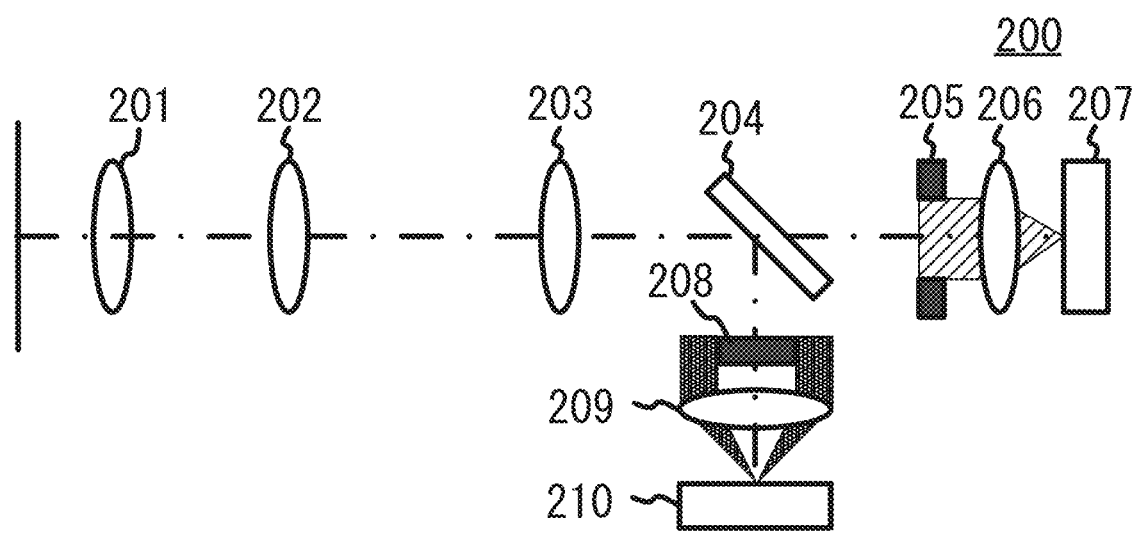
FIG. 18 is a diagram illustrating a configuration of a microscope 200.

The microscope 200 illustrated in FIG. 18 includes an objective lens 201, an imaging lens 202, a plurality of lenses (a lens 203, a lens 206, and a lens 209), a splitter 204 as a half mirror, two modulation elements (a modulation element 205 and a modulation element 208), and two image pickup devices (an image pickup device 207 and an image pickup device 210).

In the microscope 200, the image pickup device 207 acquires a first image when the modulation element 205 blocks a light beam corresponding to a high numerical aperture, and the image pickup device 210 acquires a second image when the modulation element 208 blocks a light beam corresponding to a low numerical aperture.

Figure 19:
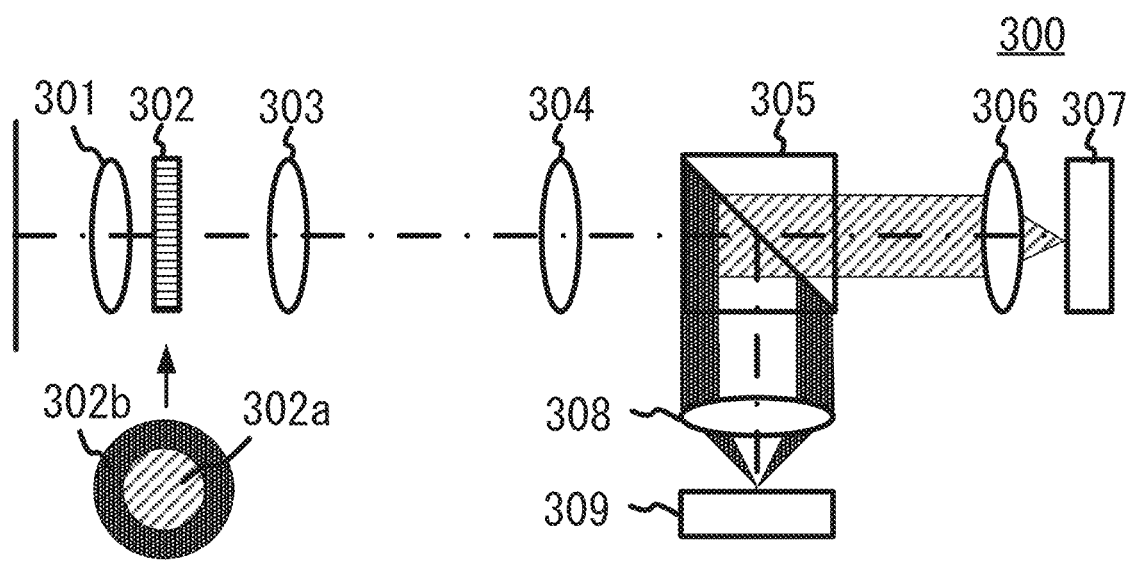
FIG. 19 is a diagram illustrating a configuration of a microscope 300.

The microscope 300 illustrated in FIG. 19 includes an objective lens 301, a modulation element 302, an imaging lens 303, a plurality of lenses (a lens 304, a lens 306, and a lens 308), a splitter 305 as a polarization beam splitter, and two image pickup devices (an image pickup device 307 and an image pickup device 309). The modulation element 302 includes a polarizing plate 302*a* and a polarizing plate 302*b*. In the modulation element 302, the polarizing plate 302*a* and the polarizing plate 302*b* respectively transmit polarized light beams having polarization directions perpendicular to each other.

In the microscope 300, when the splitter 305 separates the polarized light beam that has passed through the polarizing plate 302*a* and the polarized light beam that has passed through the polarizing plate 302*b*, the image pickup device 307 acquires a first image, and the image pickup device 309 acquires a second image.

Figure 20:
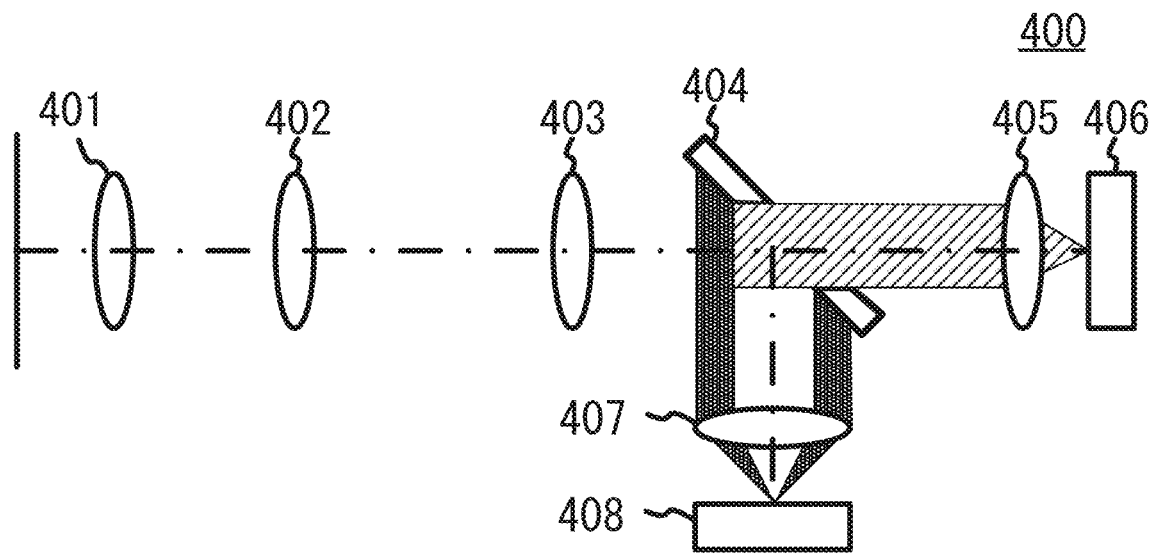
FIG. 20 is a diagram illustrating a configuration of a microscope 400.

The microscope 400 illustrated in FIG. 20 includes an objective lens 401, an imaging lens 402, a plurality of lenses (a lens 403, a lens 405, and a lens 407), a mirror 404 having an opening formed therein, and two image pickup devices (an image pickup device 406 and an image pickup device 408).

In the microscope 400, when the mirror 404 reflects a light beam corresponding to a high numerical aperture and transmits a light beam corresponding to a low numerical aperture, the image pickup device 406 acquires a first image and the image pickup device 408 acquires a second image.

Figure 21:
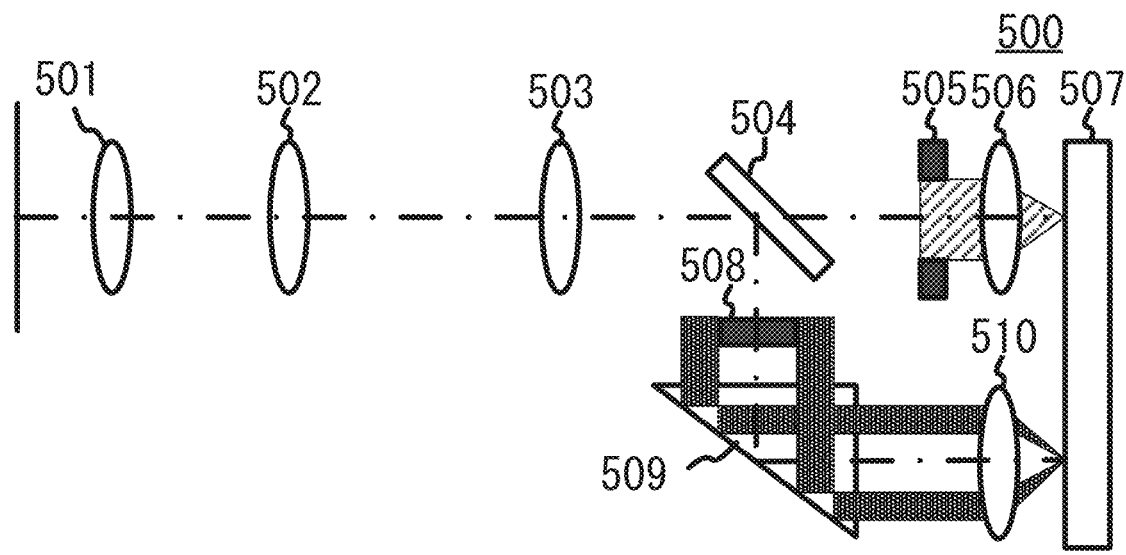
FIG. 21 is a diagram illustrating a configuration of a microscope 500.

The microscope 500 illustrated in FIG. 21 includes an objective lens 501, an imaging lens 502, a plurality of lenses (a lens 503, a lens 506, and a lens 510), a splitter 504 as a half mirror, two modulation elements (a modulation element 505 and a modulation element 508), a prism 509, and an image pickup device 507.

The microscope 500 is similar to the microscope 200 except that a first image and a second image are acquired by the same image pickup device 507 using the splitter 504 and the prism 509.

Figure 22:
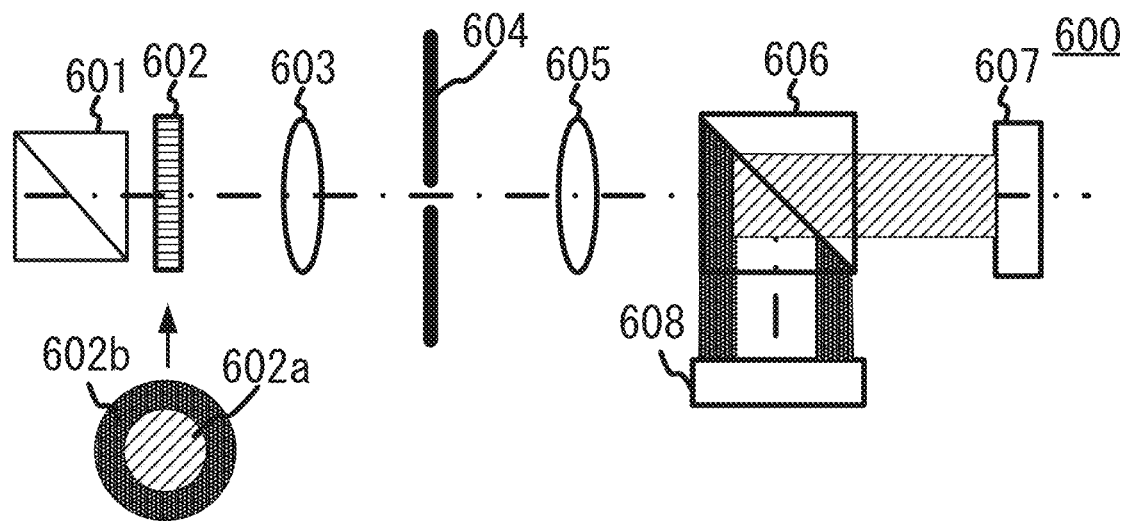
FIG. 22 is a diagram illustrating a configuration of a microscope 600.

The microscope 600 illustrated in FIG. 22 is a confocal microscope. The microscope 600 includes a scanner 601, a modulation element 602, a plurality of lenses (a lens 603 and a lens 605), a splitter 606 as a polarization beam splitter, and two photodetectors (a photodetector 607 and a photodetector 608). The modulation element 602 includes a polarizing plate 602a and a polarizing plate 602b, and the polarizing plate 602a and the polarizing plate 602b respectively transmit polarized light beams having polarization directions perpendicular to each other.

In the microscope 600, the modulation element 602 modulates a light flux de-scanned by the scanner 601. When the PBS 606 separates a polarized light beam that has passed through the polarizing plate 602a and a polarized light beam that has passed through the polarizing plate 602b, the photodetector 607 detects a low-frequency component and the photodetector 608 detects a high-frequency component. A first image is generated based on the low-frequency component detected by the photodetector 607. A second image is generated based on the high-frequency component detected by the photodetector 608.

Figure 23:
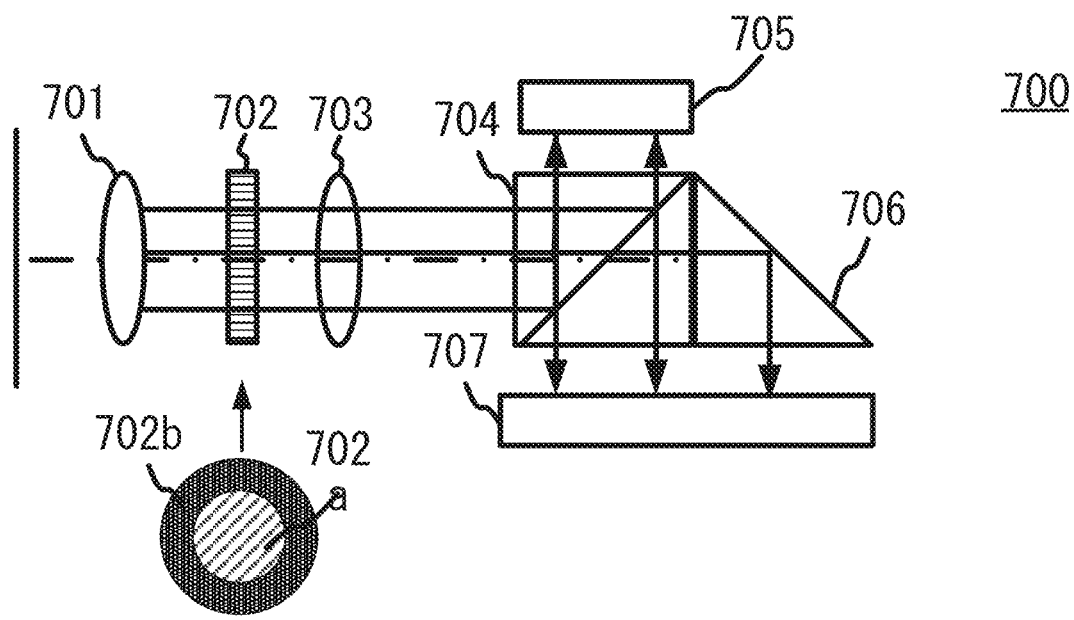
FIG. 23 is a diagram illustrating a configuration of a microscope 700.

The microscope 700 illustrated in FIG. 23 includes an objective lens 701, a modulation element 702, an imaging lens 703, a splitter 704 as a polarization beam splitter, a λ/4 plate 705, a prism 706, and an image pickup device 707. The modulation element 702 includes a polarizing plate 702a and a polarizing plate 702b. The polarizing plate 702a and the polarizing plate 702b respectively transmit polarized light beams having polarization directions perpendicular to each other.

In the microscope 700, the PBS 704 separates a polarized light beam that has passed through the polarizing plate 702a and a polarized light beam that has passed through the polarizing plate 702b. The polarized light beam reflected by the PBS 704 reciprocates in the λ/4 plate 705 to convert its polarization direction, and is transmitted by the PBS 704. As a result, a first image and a second image are acquired by the same image pickup device 707.

Figure 24:
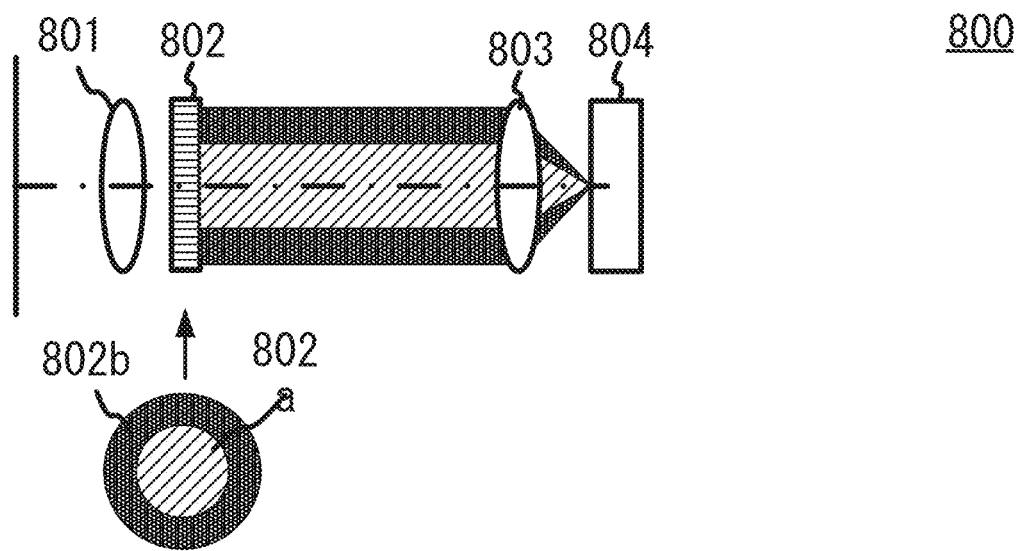
FIG. 24 is a diagram illustrating a configuration of a microscope 800.

The microscope 800 illustrated in FIG. 24 includes an objective lens 801, a modulation element 802, an imaging lens 803, and an image pickup device 804. The modulation element 802 includes a wavelength filter 802a and a wavelength filter 802b. The wavelength filter 802a and the wavelength filter 802b respectively transmit light beams having different wavelengths. The image pickup device 804 is a color camera, and separates and detects respective components in R, G, and B colors.

In the microscope 800, the modulation element 802 makes a wavelength of a light beam corresponding to a high numerical aperture and a wavelength of a light beam corresponding to a low numerical aperture different from each other. As a result, a first image and a second image are acquired by the same image pickup device 804.

Although an example in which the first modulation element and the second modulation element respectively have characteristics symmetrical to an optical axis has been illustrated, the first modulation element and the second modulation element may respectively have characteristics asymmetrical to the optical axis. For example, the first modulation element may have a transmittance distribution represented by a modulation pattern L10 illustrated in FIG. 25. The second modulation element may have a transmittance distribution represented by a modulation pattern H10 illustrated in FIG. 25. The modulation pattern H10 has a characteristic for completely blocking half of a light flux incident on the second modulation element.

Figure 26A:
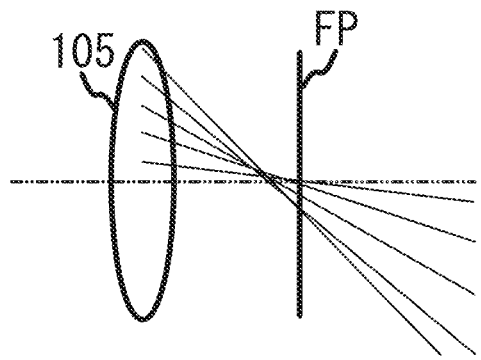
FIG. 26A is a diagram for describing an overcorrected state.
Figure 26B:
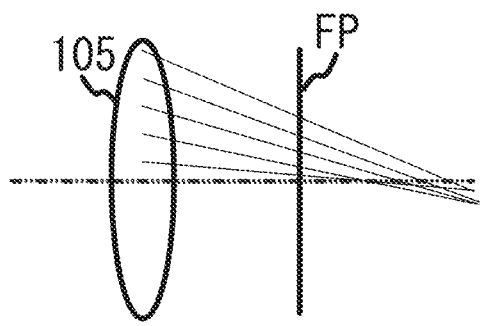
FIG. 26B is a diagram for describing an undercorrected state.
Figure 27:
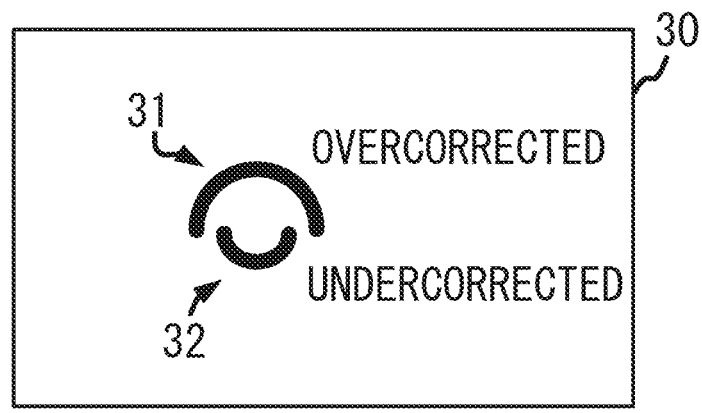
FIG. 27 is a diagram for describing a difference between an image formed in the overcorrected state and an image formed in the undercorrected state.
Figure 28:
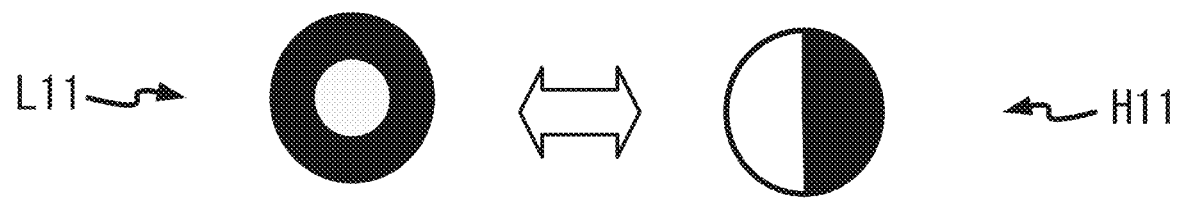
FIG. 28 is a diagram illustrating still another example of a modulation pattern of a modulation element.
Figure 29:
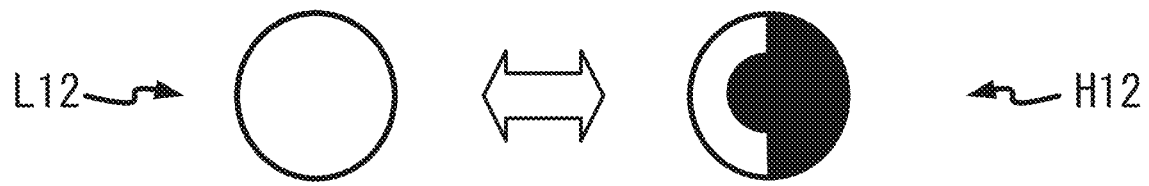
FIG. 29 is a diagram illustrating still another example of a modulation pattern of a modulation element.
Figure 30:
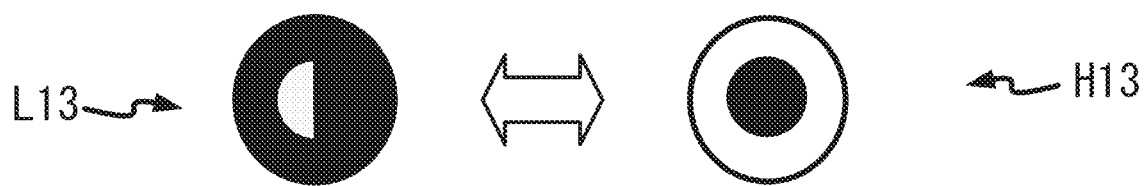
FIG. 30 is a diagram illustrating still another example of a modulation pattern of a modulation element.
Figure 31:
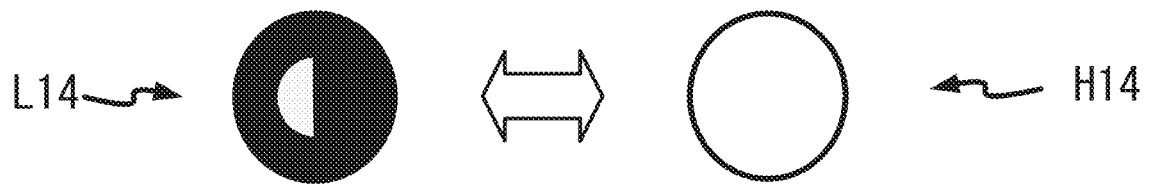
FIG. 31 is a diagram illustrating still another example of a modulation pattern of a modulation element.
Figure 32:
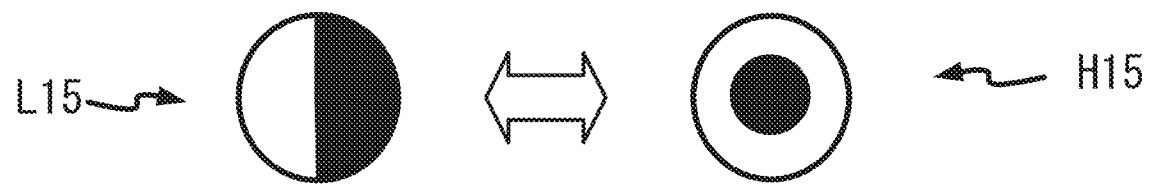
FIG. 32 is a diagram illustrating still another example of a modulation pattern of a modulation element.
Figure 33:
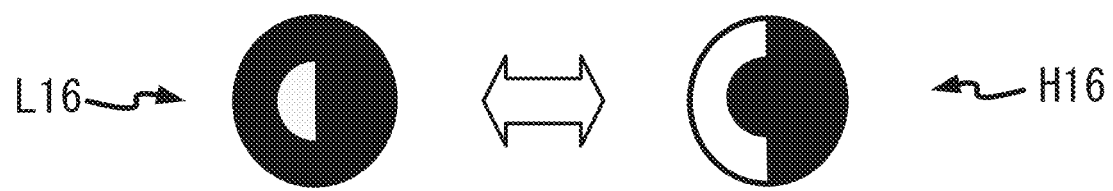
FIG. 33 is a diagram illustrating still another example of a modulation pattern of a modulation element.
Figure 34:
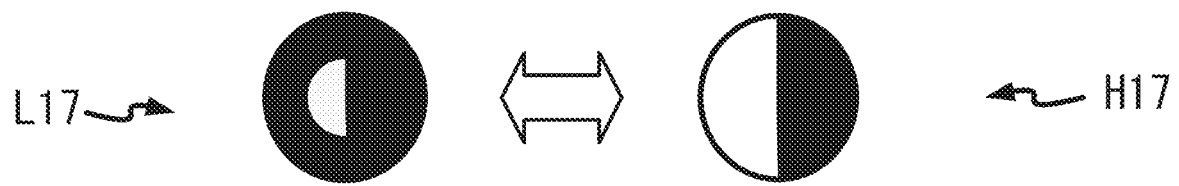
FIG. 34 is a diagram illustrating still another example of a modulation pattern of a modulation element.
Figure 35:
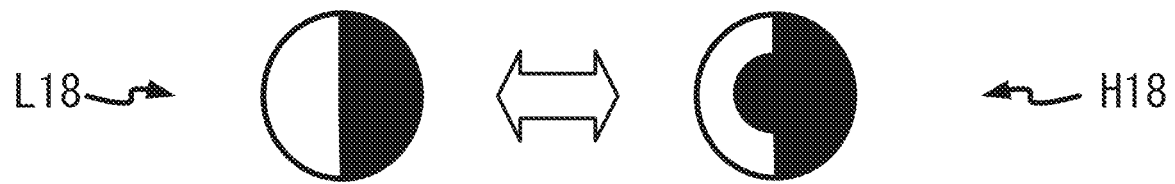
FIG. 35 is a diagram illustrating still another example of a modulation pattern of a modulation element
Figure 36:
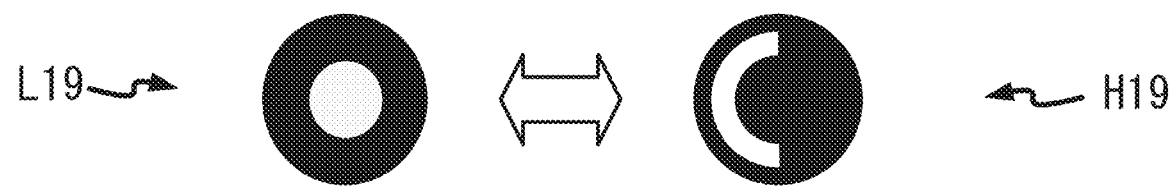
FIG. 36 is a diagram illustrating still another example of a modulation pattern of a modulation element
Figure 37:
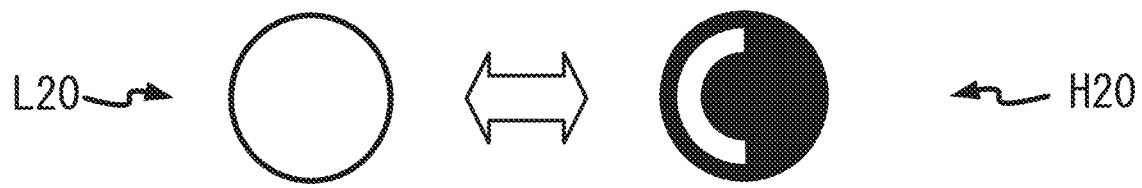
FIG. 37 is a diagram illustrating still another example of a modulation pattern of a modulation element
Figure 38:
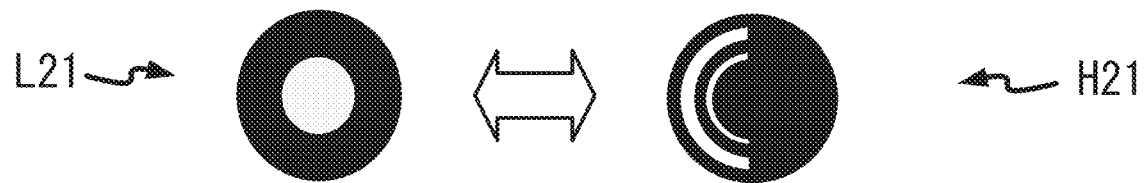
FIG. 38 is a diagram illustrating still another example of a modulation pattern of a modulation element
Figure 39:
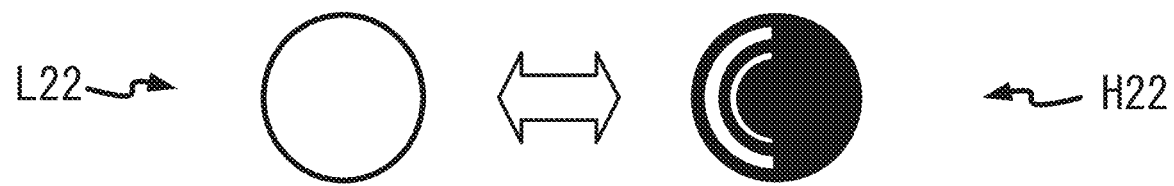
FIG. 39 is a diagram illustrating still another example of a modulation pattern of a modulation element
Figure 40:
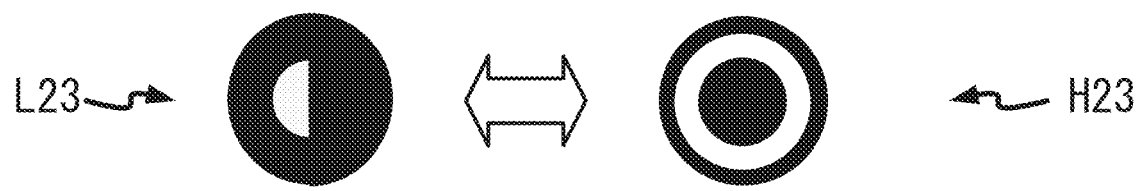
FIG. 40 is a diagram illustrating still another example of a modulation pattern of a modulation element
Figure 41:
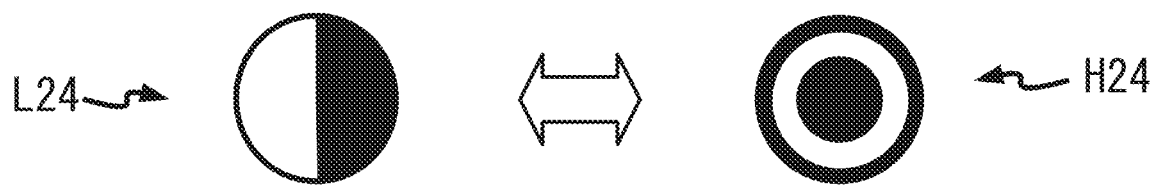
FIG. 41 is a diagram illustrating still another example of a modulation pattern of a modulation element
Figure 42:
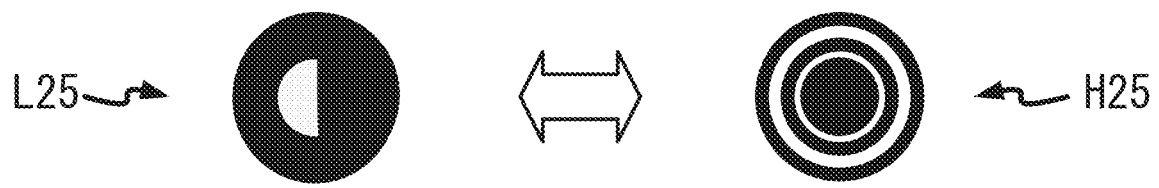
FIG. 42 is a diagram illustrating still another example of a modulation pattern of a modulation element
Figure 43:
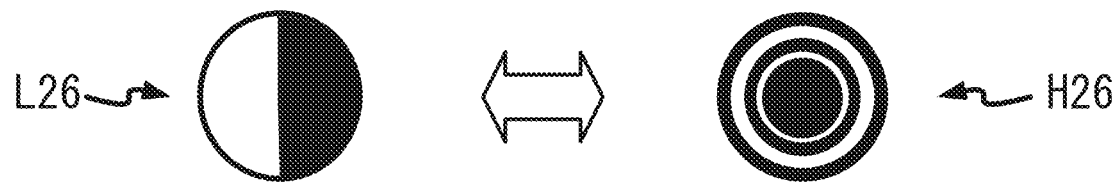
FIG. 43 is a diagram illustrating still another example of a modulation pattern of a modulation element
Figure 44:
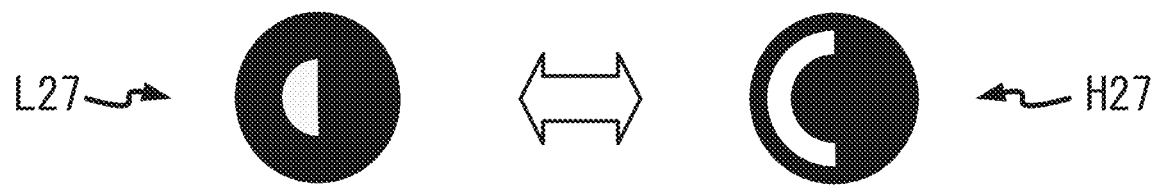
FIG. 44 is a diagram illustrating still another example of a modulation pattern of a modulation element.
Figure 45:
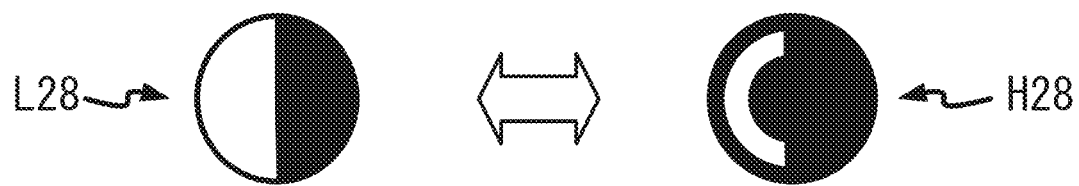
FIG. 45 is a diagram illustrating still another example of a modulation pattern of a modulation element.
Figure 46:
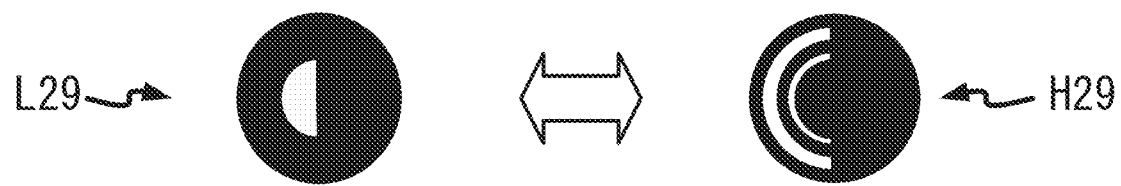
FIG. 46 is a diagram illustrating still another example of a modulation pattern of a modulation element.
Figure 47:
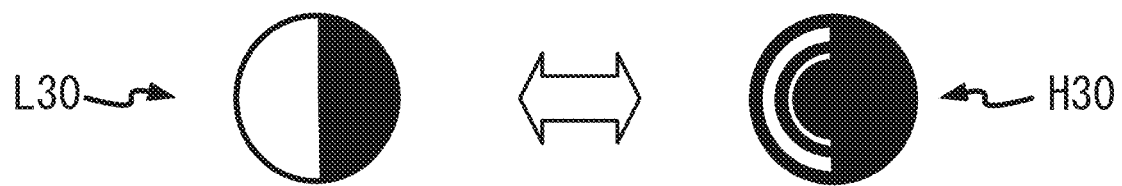
FIG. 47 is a diagram illustrating still another example of a modulation pattern of a modulation element.

For example, a first image is acquired using the first modulation element having the modulation pattern L10, to perform focusing based on the first image. Then, a second image is acquired using the second modulation element having the modulation pattern H10. Consider this case. If a spherical aberration is excessively corrected, light is collected at a position closer than a focus position FP based on a first image, as illustrated in FIG. 26A. On the other hand, if the spherical aberration is insufficiently corrected, light is collected at a position farther than the focus position FP based on the first image, as illustrated in FIG. 26B. Due to a difference therebetween, images (an image 31 and an image 32) are respectively displayed at positions that deviate in opposite directions from a center of a screen in an overcorrected state and an undercorrected state, as illustrated in FIG. 27.

Figure 25:
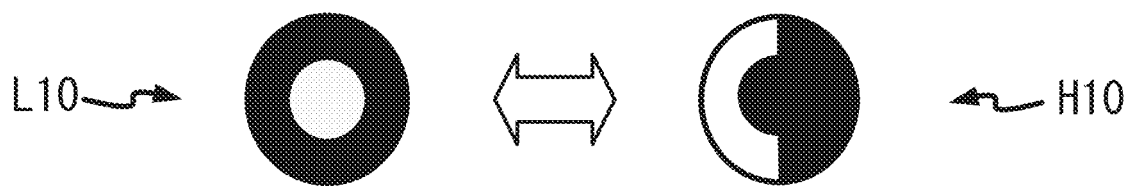
FIG. 25 is a diagram illustrating still another example of a modulation pattern of a modulation element.

Therefore, when the modulation pattern H10 illustrated in FIG. 25 is used, the control device 20 can easily identify the overcorrected state and the undercorrected state based on the images. Accordingly, aberration correction directions (i.e., a direction in which a correction amount is increased and a direction in which the correction amount is decreased) are avoided being mistaken when the aberration correction is performed. As a result, the aberration correction can be performed in a shorter time period.

An asymmetrical modulation pattern may be used in not only the aberration correction but also focusing. If the asymmetrical modulation pattern is used for focusing, a direction in which a focusing section is to move can be specified. An asymmetrical modulation pattern may be used in both aberration correction and focusing. For example, combinations of modulation patterns illustrated in FIGS. 28 to 47 (a modulation pattern L11 and a modulation pattern H11 to a modulation pattern L30 and a modulation pattern H30) may be used. The point that even when the modulation patterns are used, both an image that is not easily affected by the spherical aberration and an image that is easily affected by the spherical aberration can be acquired is similar to that when the modulation patterns illustrated in FIG. 6, FIG. 8, and FIGS. 10 to 16 are used.

Second Embodiment

Figure 48:
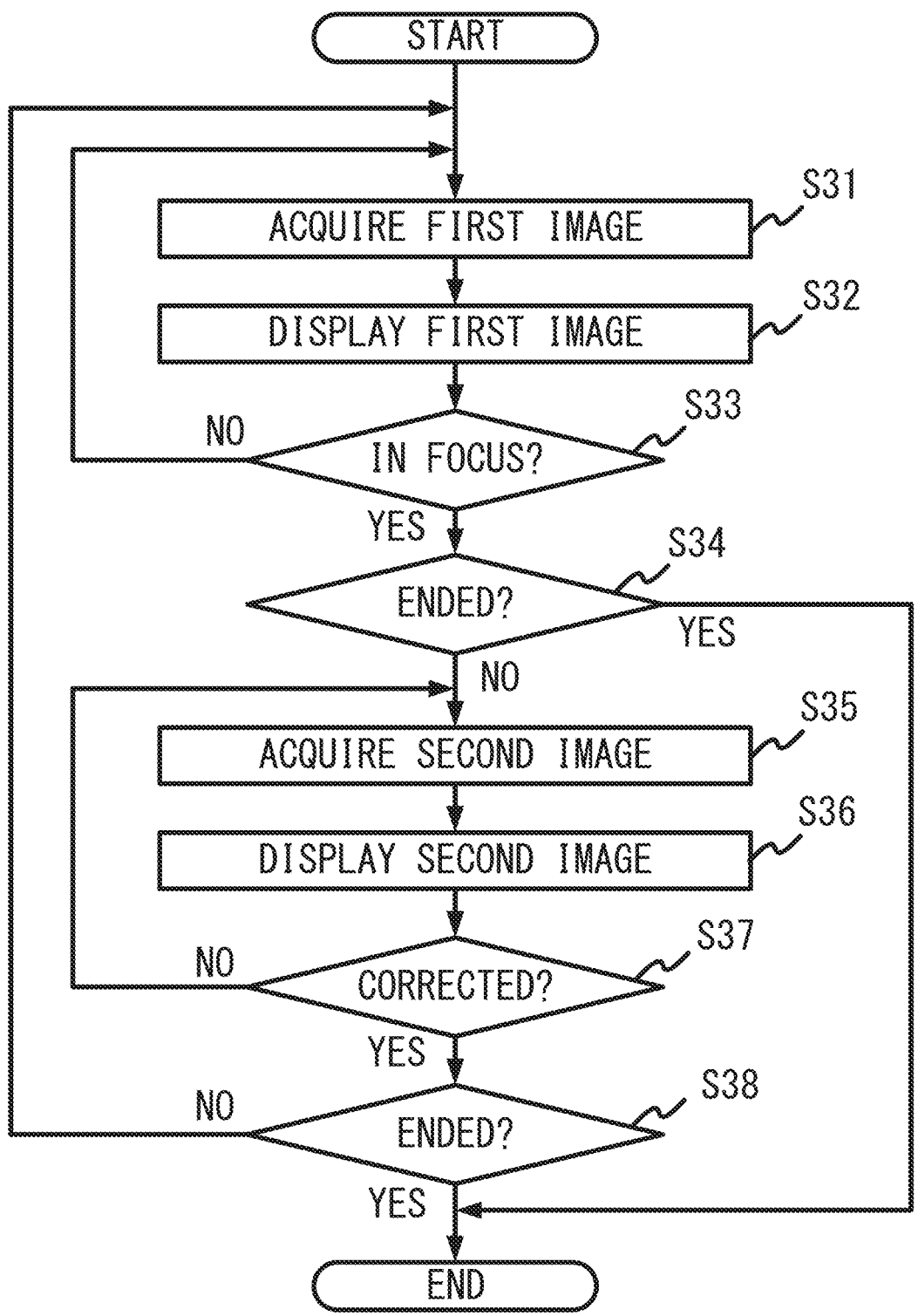
FIG. 48 is a flowchart of semi-automatic adjustment processing according to a second embodiment.

FIG. 48 is a flowchart of semi-automatic adjustment processing according to the present embodiment. A configuration of a microscope system according to the present embodiment is similar to that of the microscope system according to the first embodiment. The microscope system according to the present embodiment differs from the microscope system according to the first embodiment in that it performs the semi-automatic adjustment processing illustrated in FIG. 48 instead of the automatic adjustment processing illustrated in FIG. 7.

When the semi-automatic adjustment processing illustrated in FIG. 48 is started, a control device 20 first causes a microscope 100 to acquire a first image (step S31). The control device 20 causes a display device 30 to display the image acquired by the microscope 100 (step S32). In the present embodiment, a user manually arranges a first modulation element on an optical path before step S31.

Then, the control device 20 determines whether or not an image is in focus (step S33). The control device 20 may determine whether or not the image displayed on the display device 30 is in focus depending on whether or not an instruction to end focusing has been input by a user who has confirmed the image, for example. When the user manually operates a focusing section to perform focusing, and inputs the instruction to end focusing, the control device 20 determines that the image is in focus.

Further, the control device 20 determines whether or not the semi-automatic processing is ended (step S34). The control device 20 may determine whether or not the semi-automatic processing is ended depending on whether or not a movement amount of the focusing section during a period in which the first image is displayed is less than a threshold value, for example.

When the control device 20 determines that the semi-automatic processing is not ended, the control device 20 causes the microscope 100 to acquire a second image (step S35). The control device 20 causes the display device 30 to display the image acquired by the microscope 100 (step S36). In the present embodiment, the user manually arranges a second modulation element on the optical path before step S35.

Then, the control device 20 determines whether or not an aberration has been corrected (step S37). The control device 20 may determine whether or not the aberration has been corrected depending on whether or not an instruction to end aberration correction has been input by the user who has confirmed the image displayed on the display device 30, for example. When the user manually operates a correction ring 15 to perform aberration correction, and inputs the instruction to end aberration correction, the control device 20 determines that the aberration has been corrected.

Further, the control device 20 determines whether or not the semi-automatic processing is ended (step S38). The control device 20 may determine whether or not the semi-automatic processing is ended depending on whether or not a rotation amount of the correction ring 15 during a period in which the second image is displayed is less than a threshold value, for example.

When the control device 20 determines that the semi-automatic processing is not ended, the processing returns to step S31, the above-described processing is repeated until the control device 20 determines that the semi-automatic processing is ended.

As described above, in the present embodiment, the control device 20 causes the display device 30 to display the second image when it detects the end of the focusing during the period in which the first image is displayed. The control device 20 causes the display device 30 to display the first image when it detects the end of the aberration correction during the period in which the second image is displayed. Even when the semi-automatic adjustment method illustrated in FIG. 48 is performed, both a focus and an aberration can favorably be adjusted. The semi-automatic adjustment method illustrated in FIG. 48 is also applicable to a microscope system including neither an electrically-driven correction ring nor an electrically-driven focusing section.

Third Embodiment

Figure 49:
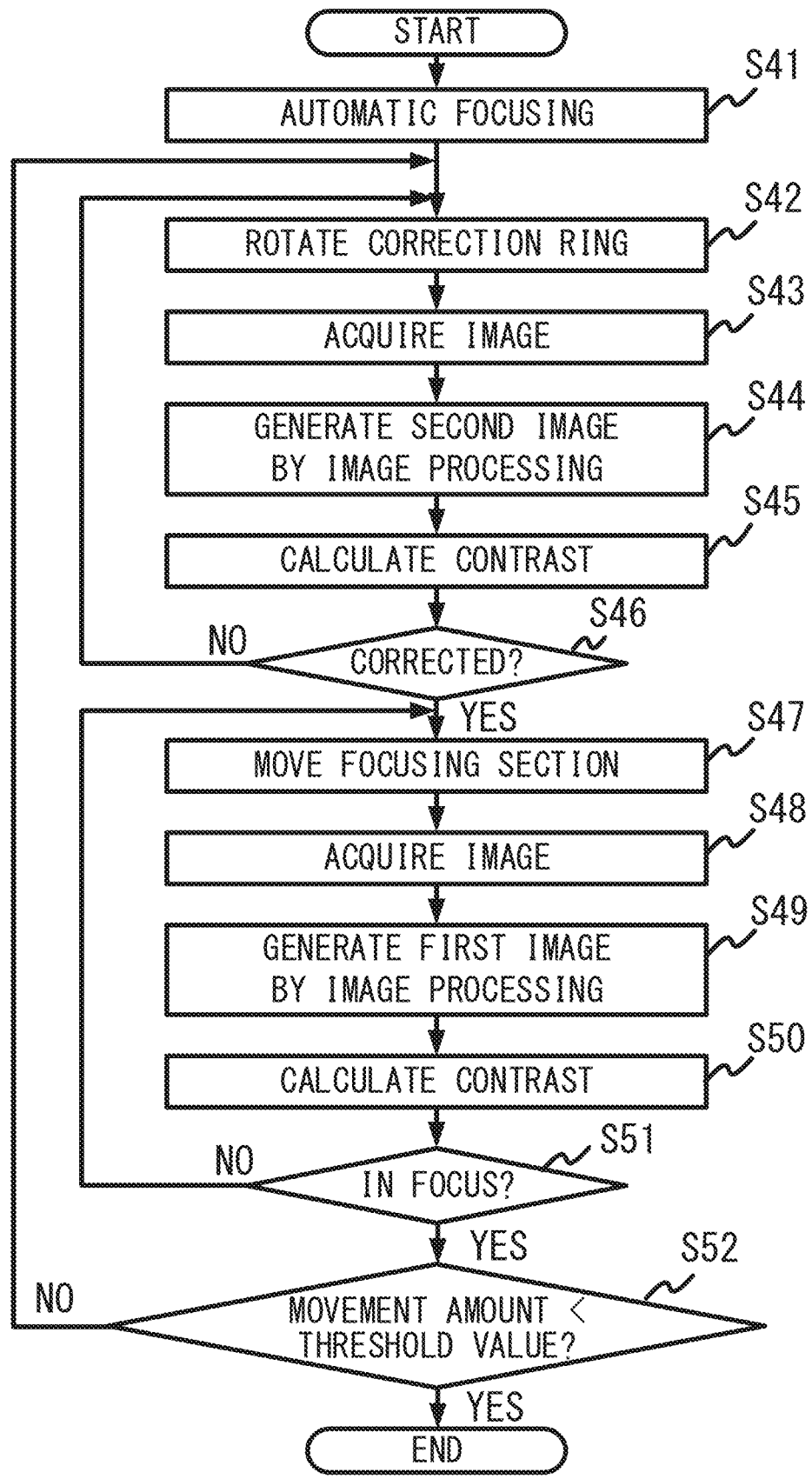
FIG. 49 is a flowchart of automatic adjustment processing according to a third embodiment.

FIG. 49 is a flowchart of automatic adjustment processing according to the present embodiment. A configuration of a microscope system according to the present embodiment is similar to that of the microscope system according to the first embodiment. The microscope system according to the present embodiment differs from the microscope system according to the first embodiment in that it performs the automatic adjustment processing illustrated in FIG. 49 instead of the automatic adjustment processing illustrated in FIG. 7. The microscope system according to the present embodiment differs from the microscope system according to the first embodiment in that a first image and a second image are generated by image processing in the automatic adjustment processing illustrated in FIG. 49, although a first image and a second image to be acquired are switched by switching modulation elements in the automatic adjustment processing illustrated in FIG. 7.

When the automatic adjustment processing illustrated in FIG. 49 is started, a control device 20 first controls a microscope 100 to perform automatic focusing (step S41). Processing in step S41 is similar to the processing in step S11 illustrated in FIG. 7.

Then, the control device 20 causes a correction ring to rotate by a predetermined amount (step S42), and causes the microscope 10 to acquire an image (step S43). Further, the control device 20 subjects the image acquired in step S43 to image processing, to generate a second image (step S44). The image processing to be performed in step S44 may be processing for subjecting the image acquired in step S43 to Fourier transformation to generate a pupil image, applying a spatial frequency filter to the pupil image, subjecting an image obtained after the filter is applied to inverse Fourier transformation. An example of the spatial frequency filter is a high-pass filter.

Then, the control device 20 calculates a contrast of the second image generated in step S44 (step S45). The control device 20 searches for setting of the correction ring in which the contrast reaches its maximum while repeating the processing in step S42 to step S45. The control device 20 determines that an aberration has been corrected when the contrast has reached the maximum (step S46).

When the aberration correction ends, the control device 20 causes a focusing section to move by a predetermined amount (step S47), and causes the microscope 10 to acquire an image (step S48). Further, the control device 20 subjects the image acquired in step S48 to image processing, to generate a first image (step S49). The image processing to be performed in step S49 may be processing for subjecting the image acquired in step S49 to Fourier transformation to generate a pupil image, applying a spatial frequency filter to the pupil image, and subjecting an image obtained after the filter is applied to inverse Fourier transformation. An example of the spatial frequency filter is a low-pass filter.

Then, the control device 20 calculates a contrast of the first image generated in step S49 (step S50). The control device 20 searches for a position of the focusing section in which the contrast reaches its maximum while repeating the processing in step S47 to step S50. The control device 20 determines that focusing has been performed when the contrast has reached the maximum (step S51).

When the focusing ends, the control device 20 determines whether or not a movement amount of the focusing section that has moved by the focusing is less than a threshold value (step S52). If the control device 20 determines that the movement amount is less than the threshold value (YES in step S52), the processing illustrated in FIG. 49 ends. On the other hand, if the control device 20 determines that the movement amount is not less than the threshold value (NO in step S52), the processing returns to step S52, the aberration correction and the focusing are repeated until the movement amount is less than the threshold value.

As described above, with the microscope system according to the present embodiment, when the automatic adjustment method illustrated in FIG. 49 is performed, both a focus and an aberration are favorably adjusted, like when the automatic adjustment method illustrated in FIG. 7 is performed. The same applies to the point that a person need not issue an instruction to the microscope system from the start to the end of the processing but the focusing and the aberration correction can be completely automatically performed. Since the microscope system according to the present embodiment does not require a modulation element, the existing microscope system can be used as it is.

Although an example in which both the first image and the second image are generated by image processing in the present embodiment, at least one of the first image and the second image may be generated by image processing.

The above-described embodiments are each a specific example for making understanding of the invention easy, and the embodiments of the present invention are not limited to these. Some of the above-described embodiments may be applied to the other embodiments. The method of adjusting the optical apparatus, the adjustment support method, the optical system, and the optical apparatus can be subjected to various modifications and alterations without departing from the spirit and scope of the claims.

Although an example in which the spherical aberration is corrected using the correction ring has been illustrated in the above-described embodiments, the correction device is not limited to the correction ring. For example, the spherical aberration may be corrected using a deformable mirror, a phase modulator capable of individually controlling a plurality of regions spatially separated, and the like instead of the correction ring. The phase modulator may be used to correct not only the spherical aberration but also any aberration, and may be further used instead of the focusing section to perform focusing.

Although an example in which the focusing or the aberration correction is ended when the contrast reaches the maximum has been illustrated in the above-describe embodiments, the focusing or the aberration correction may be ended when the contrast reaches the threshold value or more. This is because a state where the contrast is sufficiently high may be able to be considered as a state where an image is in focus or an aberration has been corrected.

What is claimed is:

1. A method of adjusting an optical apparatus that acquires an image of a sample, the adjustment method comprising the steps of:
moving a focusing section included in the optical apparatus in a direction in which a contrast of a first image of the sample increases; and
adjusting an aberration amount occurring in the optical apparatus in a direction in which a contrast of a second image of the sample increases,
wherein an average value of frequency components of the second image is higher than an average value of frequency components of the first image.

2. The adjustment method according to claim 1, further comprising the steps of
acquiring the first image by the optical apparatus, and
acquiring the second image by the optical apparatus.

3. The adjustment method according to claim 2, further comprising the steps of
changing a pupil function of an optical system of the optical apparatus between the step of acquiring the first image and the step of acquiring the second image.

4. The adjustment method according to claim 2, wherein
the step of acquiring the first image includes the step of modulating at least one of illumination light and observation light by a first modulation element, and
the step of acquiring the second image includes the step of modulating at least one of illumination light and observation light by a second modulation element having a different transmittance distribution from that of the first modulation element.

5. The adjustment method according to claim 4, wherein the following conditional expression is satisfied:

$$\int_0^{L1} r \cdot f(r) dr < \int_0^{L2} r \cdot g(r) dr \quad (1)$$

where f(r) is a transmittance distribution of the first modulation element, g(r) is a transmittance distribution of the second modulation element, r is a distance from an optical axis, L1 is a radius of an on-axis bundle of rays when the on-axis bundle of rays is incident on the first modulation element, and L2 is a radius of the on-axis bundle of rays when the on-axis bundle of rays is incident on the second modulation element.

6. The adjustment method according to claim 1, further comprising the step of
subjecting an image acquired by the optical apparatus to image processing to generate at least one of the first image and the second image.

7. The adjustment method according to claim 6, wherein
the step of generating at least one of the first image and the second image includes the step of applying a spatial frequency filter to a pupil image obtained by subjecting the image acquired by the optical apparatus to Fourier transformation.

8. The adjustment method according to claim 1, wherein
the step of adjusting an aberration amount occurring in the optical apparatus includes the step of adjusting a correction ring included in the optical apparatus.

9. An optical system comprising:
an optical apparatus that acquires an image of a sample, the optical apparatus including an objective lens, a focusing section that changes a distance between the objective lens and the sample, and a correction device that corrects an aberration; and
a control device that controls the optical apparatus, wherein
the control device
causes the focusing section to move in a direction in which a contrast of a first image of the sample increases, and
changes setting of the correction device to adjust an aberration amount occurring in the optical apparatus in a direction in which a contrast of a second image of the sample increases, and an average value of frequency components of the second image is higher than an average value of frequency components of the first image.

10. The optical system according to claim 9, wherein the correction device includes a correction ring that corrects a spherical aberration.

11. The optical system according to claim 9, wherein the optical apparatus includes a microscope.

* * * * *